(12) United States Patent
Fukutome et al.

(10) Patent No.: US 11,740,739 B2
(45) Date of Patent: Aug. 29, 2023

(54) OPTICAL MODULE OR ELECTRONIC DEVICE

(71) Applicant: SEMICONDUCTOR ENERGY LABORATORY CO., LTD., Atsugi (JP)

(72) Inventors: Takahiro Fukutome, Kanagawa (JP); Hidenori Mori, Tochigi (JP); Hironori Matsumoto, Tochigi (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 353 days.

(21) Appl. No.: 16/604,859

(22) PCT Filed: Apr. 16, 2018

(86) PCT No.: PCT/IB2018/052613
§ 371 (c)(1),
(2) Date: Oct. 11, 2019

(87) PCT Pub. No.: WO2018/197986
PCT Pub. Date: Nov. 1, 2018

(65) Prior Publication Data
US 2020/0167015 A1   May 28, 2020

(30) Foreign Application Priority Data
Apr. 28, 2017  (JP) .................. 2017-089468

(51) Int. Cl.
*G06F 3/042*  (2006.01)
*F21V 8/00*  (2006.01)
*G02F 1/1333*  (2006.01)

(52) U.S. Cl.
CPC ........... *G06F 3/042* (2013.01); *G02B 6/0026* (2013.01); *G02B 6/0031* (2013.01); *G02F 1/13338* (2013.01)

(58) Field of Classification Search
CPC ..... G06F 3/042; G06F 3/0428; G02B 6/0026; G02B 6/0031; G02B 6/009; G02B 6/0088;
(Continued)

(56) References Cited
U.S. PATENT DOCUMENTS 9,071,720 B2    6/2015   Ikari et al.
9,152,274 B2   10/2015   Sugiyama
(Continued)

FOREIGN PATENT DOCUMENTS

EP    2706511 A    3/2014
JP    2000-267810 A    9/2000
(Continued)

OTHER PUBLICATIONS

International Search Report (Application No. PCT/IB2018/052613) dated Jul. 17, 2018.
(Continued)

*Primary Examiner* — Kenneth Bukowski
(74) *Attorney, Agent, or Firm* — Nixon Peabody LLP; Jeffrey L. Costellia

(57) ABSTRACT

An electronic device using a novel optical module is provided.
The optical module includes a first light-emitting element, an optical conversion element, and a first light-receiving element. The first light-emitting element includes a plurality of fluorescent substances and a light-emitting diode. The optical conversion element includes a first optical filter. The light-emitting diode emits first light, and the fluorescent substances can emit second light by being excited by the first
(Continued)

light. The first optical filter can form third light having a wavelength range longer than 680 nm from the second light. The first light-receiving element has the function of detecting the third light, and the first light-receiving element functions as a sensor detecting the existence of a shielding object on a light path connecting the first light-emitting element and the first light-receiving element. Furthermore, the second light formed by the optical module can function as a light source of the display device.

18 Claims, 17 Drawing Sheets

(58) Field of Classification Search
CPC .......... G02F 1/13338; G02F 1/133615; G02F 1/133553
See application file for complete search history.

(56) References Cited

U.S. PATENT DOCUMENTS

| | | | | |
|---|---|---|---|---|
| 2009/0146992 A1* | 6/2009 | Fukunaga | ........... | G02F 1/13338 345/214 |
| 2012/0313923 A1* | 12/2012 | Minami | ............... | G09G 3/3233 345/212 |
| 2013/0100083 A1 | 4/2013 | Sugiyama | | |
| 2013/0135359 A1 | 5/2013 | Gaily et al. | | |
| 2014/0063567 A1 | 3/2014 | Ikari et al. | | |
| 2016/0364007 A1* | 12/2016 | Kamovich | .............. | G06F 3/017 |
| 2017/0364249 A1* | 12/2017 | Kumaki | .................... | G06F 3/14 |

FOREIGN PATENT DOCUMENTS

| | | | |
|---|---|---|---|
| JP | 2005-294288 A | | 10/2005 |
| JP | 2006-163751 A | | 6/2006 |
| JP | 2006163751 A | * | 6/2006 |
| JP | 2013-092893 A | | 5/2013 |
| JP | 2014-053739 A | | 3/2014 |
| WO | WO-2013/082038 | | 6/2013 |

OTHER PUBLICATIONS

Written Opinion (Application No. PCT/IB2018/052613) dated Jul. 17, 2018.

* cited by examiner

118c CF layer
118b Liquid crystal layer
118a TFT layer
117c Diffusion layer
117b Light guide layer
117a Reflective layer 117b Light guide layer
117c Diffusion layer
118c CF layer
118b Liquid crystal layer
118a TFT layer 118c  CF layer
118b  Liquid crystal layer
118a  TFT layer
117c  Diffusion layer
117b  Light guide layer

OPTICAL MODULE OR ELECTRONIC DEVICE

TECHNICAL FIELD

One embodiment of the present invention relates to an optical module or an electronic device.

Note that one embodiment of the present invention is not limited to the above technical field. The technical field of one embodiment of the invention disclosed in this specification and the like relates to an object, a method, or a manufacturing method. In particular, one embodiment of the present invention relates to a semiconductor device, a display device, a light-emitting device, a power storage device, a memory device, a driving method thereof, or a manufacturing method thereof.

In this specification and the like, a semiconductor device means an element, a circuit, a device, or the like that can function by utilizing semiconductor characteristics. For example, a semiconductor element such as a transistor or a diode is a semiconductor device. For another example, a circuit including a semiconductor element is a semiconductor device. For yet another example, a device provided with a circuit including a semiconductor element is a semiconductor device.

BACKGROUND ART

Electronic devices such as smartphones, tablets, e-books, digital signage, and the like have been widely used. Electronic devices such as smartphones, tablets, e-books, digital signage, and the like are required to display an image with brightness suitable for the usage environment. Furthermore, tablets, e-books, digital signage, and the like are required to be usable for a long time.

A display device included in an electronic device preferably performs display utilizing external light in an environment with sufficiently bright external light such as natural light and interior lighting. A display device preferably performs display utilizing a transmissive display element or a light-emitting element in an environment where sufficiently bright external light is not available. For a display device, reduction in power consumption due to driving appropriate to the environment where the electronic device is used has been proposed.

Furthermore, a display device preferably includes a touch panel. A user can start a program included in the electronic device through the touch panel. Patent Document 1, for example, discloses a display device that includes an optical touch panel.

It is known that a display device including a transmissive display element performs display by transmitting light supplied from a light source. A backlight unit including a cold cathode tube, an LED (Light Emitting Diode), or the like is used as the light source. Patent Document 2, for example, discloses a light-emitting device from which white light is obtained when a fluorescent substance is excited by optical energy of a light-emitting diode that emits near-ultraviolet light. It is disclosed that the fluorescent substance that emits red light by being excited by near-ultraviolet light has a peak in a wavelength range of 700 nm or longer.

REFERENCE

Patent Documents

[Patent Document 1] Japanese Published Patent Application No. 2013-92893

[Patent Document 2] Japanese Published Patent Application No. 2005-294288

SUMMARY OF THE INVENTION

Problems to be Solved by the Invention

When an electronic device increases in size, a time constant (e.g., wiring resistance and parasitic capacitance) of the touch panel increases. Concerning the touch detection accuracy, there is an issue of the SN ratio being lowered as a time constant increases. In addition, an increase in time constant decreases drive frequency of the touch panel. Thus, an increase in time constant causes a problem in that the response accuracy of the touch panel is decreased.

One of methods for performing display by utilizing external light is the use of a reflective liquid crystal display device. A reflective liquid crystal display device does not require a backlight unit and thus consumes less power; however, it has a problem in that favorable display is only possible in a place where bright external light is available. Although a transmissive liquid crystal display can favorably perform display by being supplied with light from a backlight unit, there is a problem in that the backlight unit consumes high power.

In view of the above problems, an object of one embodiment of the present invention is to provide an electronic device with a novel structure. Another object of one embodiment of the present invention is to provide a novel optical touch sensor. Another object of one embodiment of the present invention is to provide an electronic device that reduces power consumption.

Note that the description of these objects do not preclude the existence of other objects. One embodiment of the present invention does not need to achieve all the objects. Other objects will be apparent from and can be extracted from the description of the specification, the drawings, the claims, and the like.

Note that the objects of one embodiment of the present invention are not limited to the objects listed above. The objects listed above does not preclude the existence of other objects. The other objects are the ones that are not described above and will be described below. Objects that are not described above can be derived from the description of the specification, the drawings, and the like by those skilled in the art, and can be appropriately extracted from the description. Note that one embodiment of the present invention is to solve at least one of the above-listed description and/or the other objects.

Means for Solving the Problems

One embodiment of the present invention is an optical module including a first light-emitting element, a first optical conversion element, and a first light-receiving element, characterized by the following. The first light-emitting element includes a plurality of fluorescent substances and a light-emitting diode. The first optical conversion element includes a first optical filter. The light-emitting diode has a function of emitting first light. The plurality of fluorescent substances emit second light by being excited by the first light. The first optical filter has a function of forming third light having a wavelength range longer than 680 nm from the second light. The second light has a function of a light source. The first light-receiving element has a function of detecting the third light. The first light-receiving element has a function of a sensor detecting the existence of a shielding object on a light path connecting the first light-emitting element and the first light-receiving element.

An electronic device of one embodiment of the present invention is an electronic device including an optical module, a housing, and a display device, characterized by the following. The housing includes a first opening, a second opening, and a third opening. The display device includes a first display region. The first display region is placed to overlap with the first opening. The optical module includes a first light-emitting element, a first optical conversion element, and a first light-receiving element. The first light-emitting element includes a plurality of fluorescent substances and a light-emitting diode. The first optical conversion element includes a first optical filter. The light-emitting diode has a function of emitting first light. The plurality of fluorescent substances emit second light by being excited by the first light. The first optical filter has a function of forming third light having a wavelength range longer than 680 nm from the second light. The second light has a function of a light source for displaying the first display region. The second opening has a function of a first light guide path for delivering the third light. The third opening has a function of a second light guide path for the third light to enter. The third light passing over the first display region has a function of reaching from the second opening to the third opening. The first light-receiving element has a function of a sensor detecting the existence of a shielding object on a light path connecting the first light-emitting element and the first light-receiving element.

In the above structure, the electronic device characterized by the following is preferable. The display device includes a reflective liquid crystal element. The first optical conversion element further includes a second optical filter. The second optical filter has a function of forming fourth light wvith a wavelength range of 680 nm or less from the second light. The fourth light is supplied to the display device. The reflective liquid crystal element performs display in the first display region by reflecting the fourth light.

In the above structure, the electronic device characterized in that the display device includes a transmissive liquid crystal element and the transmissive liquid crystal element performs display in the first display region by transmitting the fourth light is preferable.

In the above structure, the electronic device characterized in that the transmissive liquid crystal element performs display in the first display region by transmitting the second light is preferable.

An electronic device of one embodiment of the present invention is an electronic device including an optical module, a housing, and a display device. The housing includes a first opening to a sixth opening. The display device includes a first display region and a second display region. The first display region is placed to overlap with the first opening. The second display region is placed to overlap with the fourth opening. The first opening and the fourth opening are placed to overlap with each other. The optical module includes a first light-emitting element, a second light-emitting element, a first optical conversion element, a second optical conversion element, a first light-receiving element, and a second light-receiving element. The first light-emitting element and the second light-emitting element each include a plurality of fluorescent substances and a light-emitting diode. The first optical conversion element and the second optical conversion element each include a first optical filter. The light-emitting diode has a function of emitting first light. The plurality of fluorescent substances emit second light by being excited by the first light. The first optical filter included in the first optical conversion element has a function of forming third light having a wavelength range longer than 680 nm from the second light emitted by the first light-emitting element. The first optical filter included in the second optical conversion element has a function of forming fourth light having a wavelength range longer than 680 nm from the second light emitted by the second light-emitting element. The second light has a function of a light source for performing display in the first display region and the second display region. The first light-receiving element has a function of detecting the third light emitted by the first light-emitting element. The second light-receiving element has a function of detecting the fourth light emitted by the second light-emitting element. The second opening has a function of a first light guide path for delivering the third light. The third opening has a function of a second light guide path for the third light to enter. The third light passing over the first display region has a function of reaching from the second opening to the third opening. The first light-receiving element has a function of a sensor detecting the existence of a shielding object on a light path connecting the first light-emitting element and the first light-receiving element. The fifth opening has a function of a third light guide path for delivering the fourth light. The sixth opening has a function of a fourth light guide path for the fourth light to enter. The fourth light passing over the second display region has a function of reaching from the fifth opening to the sixth opening. The second light-receiving element is characterized by a function of a sensor detecting the existence of a shielding object on a light path connecting the second light-emitting element and the second light-receiving element.

In the above structure, the electronic device is characterized by the following. The display device includes a transmissive liquid crystal element. The second light has a function of a light source for performing display in the first display region and the second display region. The first display region displays a first image in a first direction. The second display region displays a second image in a second direction. The first image is different from the second image.

In the above structure, the electronic device is characterized by the following. The display device includes a third light-emitting element. The third light-emitting element has a function of a light source for performing display in the first display region and the second display region. The first display region displays a first image in a first direction. The second display region displays a second image in a second direction. The first image and the second image are displayed mirror-symmetrically.

In the above structure, the electronic device characterized in that the housing further includes a seventh opening and the seventh opening has a function of delivering the second light or the fourth light as illumination light is preferable.

In the above structure, the electronic device characterized by the following is preferable. The light-emitting diode has a function of emitting near-ultraviolet light. The light-emitting diode emits light in which emission intensity of any one of wavelengths within a wavelength range longer than 680 nm is greater than the average value of emission intensity of a wavelength range from 550 nm to 560 nm, by exciting the fluorescent substances. The plurality of fluorescent substances emit white light having a wavelength of 680 nm or less by being excited by the light-emitting diode.

In the above structure, the electronic device characterized in that the third light-emitting element includes an LED is preferable.

In the above structure, the electronic device characterized in that the third light-emitting element includes an OLED is preferable.

In the above structure, the electronic device in which the display device includes a transistor and the transistor includes a metal oxide in a semiconductor layer is preferable.

In the above structure, the electronic device characterized in that the display device has a resolution higher than or equal to 8K resolution is preferable.

Effects of the Invention

One embodiment of the present invention can provide an electronic device with a novel structure. Another embodiment of the present invention can provide a novel optical touch sensor. Another embodiment of the present invention can provide an electronic device that reduces power consumption.

Note that the effects of one embodiment of the present invention are not limited to the effects listed above. The effects listed above do not preclude the existence of other effects. The other effects are the ones that are not described above and will be described below. Effects that are not described above can be derived from the description of the specification, the drawings, and the like by those skilled in the art, and can be appropriately extracted from the description. Note that one embodiment of the present invention is to have at least one of the above-listed effects and/or the other effects. Thus, one embodiment of the present invention might not have the effects listed above in some cases.

MODES FOR CARRYING OUT THE INVENTION

Figure 1A:
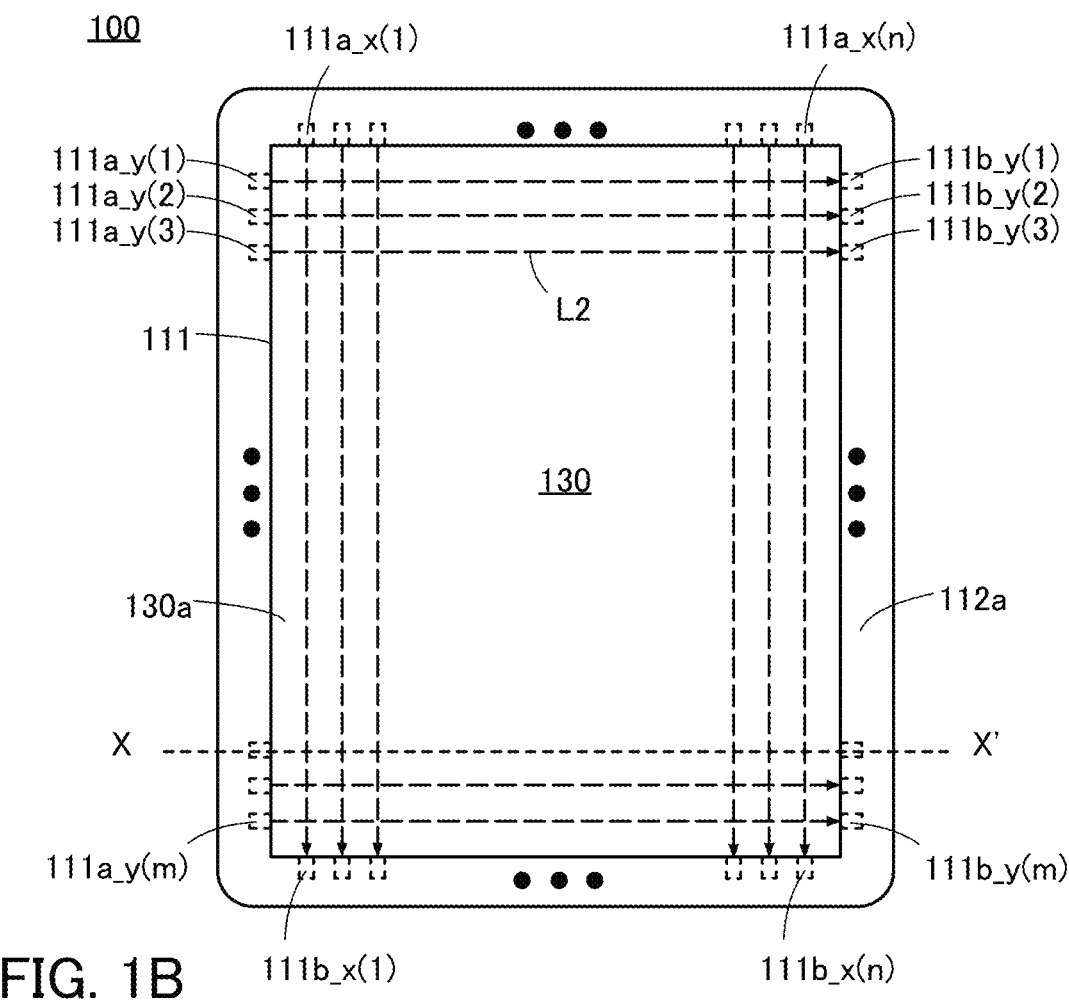
FIG. 1 (A) A diagram illustrating an electronic device. (B) A cross-sectional view illustrating the configuration of an electronic device.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be interpreted as being limited to the description of embodiments below. Note that in the structures of the invention described below, the same portions or portions having similar functions are denoted by the same reference numerals in different drawings, and description thereof is not repeated in some cases.

Furthermore, the position, size, range, and the like of each component illustrated in the drawings and the like do not represent the actual position, size, range, and the like in some cases for easy understanding of the invention. Therefore, the disclosed invention is not necessarily limited to the position, size, range, and the like as disclosed in the drawings and the like. For example, in the actual manufacturing process, a layer, a resist mask, or the like might be unintentionally reduced in size by treatment such as etching, which might not be reflected in the drawings for easy understanding of the invention.

Furthermore, especially in a top view (also referred to as a "plan view"), a perspective view, or the like, the description of some components might be omitted for easy understanding of the invention. In addition, the description of some hidden lines and the like might be omitted.

Ordinal numbers such as "first" and "second" in this specification and the like are used in order to avoid confusion among components and do not denote the priority or the order such as the order of steps or the stacking order. A term without an ordinal number in this specification and the like might be provided with an ordinal number in the scope of claims in order to avoid confusion among components. An ordinal number used in this specification and the like and an ordinal number used in the scope of claims might be different from each other. Furthermore, even when a term is provided with an ordinal number in this specification and the like, the ordinal number might be omitted in the scope of claims and the like.

In this specification and the like, the term such as an "electrode" or a "wiring" does not limit a function of the component. For example, an "electrode" is used as part of a "wiring" in some cases, and vice versa. Furthermore, the term "electrode" or "wiring" can also mean the provision of a plurality of "electrodes" and "wirings" in an integrated manner.

In this specification and the like, a transistor is an element having at least three terminals including a gate, a drain, and a source. The transistor has a channel region between the drain (a drain terminal, a drain region, or a drain electrode) and the source (a source terminal, a source region, or a source electrode), and can make current flow between the source and the drain through the channel formation region. Note that in this specification and the like, a channel region refers to a region through which current mainly flows.

Unless otherwise specified, transistors described in this specification and the like are enhancement-type (normallyoff-type) field-effect transistors. Furthermore, unless otherwise specified, transistors described in this specification and the like are n-channel transistors. Thus, unless otherwise specified, the threshold voltage (also referred to as "Vth") is higher than 0 V.

Note that the Vth of a transistor including a back gate in this specification and the like refers to a Vth obtained when the potential of the back gate is set equal to that of a source or a gate, unless otherwise specified.

Unless otherwise specified, off-state current in this specification and the like refers to a drain current of a transistor in an off state (also referred to as a non-conducting state or a cutoff state). Unless otherwise specified, the off state of an n-channel transistor refers to a state where the potential difference between its gate and source based on the source (hereinafter, also referred to as "Vg") is lower than the threshold voltage Vth, and the off state of a p-channel transistor refers to a state where the voltage Vg between its gate and source is higher than the threshold voltage Vth. For example, the off-state current of an n-channel transistor sometimes refers to a drain current at the time when Vg is lower than the threshold voltage (hereinafter also referred to as "Vth").

In the above description of off-state current, a drain may be replaced with a source. That is, the off-state current sometimes refers to current that flows through a source of a transistor in an off state.

In this specification and the like, leakage current sometimes expresses the same meaning as off-state current. Furthermore, in this specification and the like, the off-state current sometimes refers to current that flows between a source and a drain of a transistor in an off state, for example.

Note that voltage refers to a potential difference between two points, and potential refers to electrostatic energy (electric potential energy) of a unit charge at a given point in an electrostatic field. Note that in general, a potential difference between a potential of one point and a reference potential (e.g., a ground potential) is simply called potential or voltage, and potential and voltage are used as synonymous words in many cases. Thus, in this specification, potential may be rephrased as voltage and voltage may be rephrased as potential unless otherwise specified.

In the case where there is an explicit description, "X and Y are connected" in this specification and the like, the case where X and Y are electrically connected, the case where X and Y are functionally connected, and the case where X and Y are directly connected are disclosed in this specification and the like. Accordingly, without limitation to a predetermined connection relation, for example, a connection relation shown in drawings or text, connection relation other than a connection relation shown in drawings or text is included in the drawings or the text.

Furthermore, in this specification and the like, "electrically connected" includes the case where connection is made through an "object having any electric function". Here, there is no particular limitation on the "object having any electric function" as long as electric signals can be transmitted and received between the connected components. Accordingly, even when the expression "being electrically connected" is used, there is a case in which no physical connection portion is made and a wiring is just extended in an actual circuit.

Note that the term "over" or "under" in this specification and the like does not necessarily mean directly over or directly under regarding the positional relationship between components, nor limit the positional relationship to direct contact. The expression "electrode B over insulating layer A" does not require the electrode B to be provided on and in direct contact with the insulating layer A, nor excludes the case where another component is provided between the insulating layer A and the electrode B.

In this specification, the term "parallel" refers to a state where two straight lines are positioned at an angle therebetween being greater than or equal to −10° and less than or equal to 10°, unless otherwise specified. Thus, the case where the angle is greater than or equal to −5° and less than or equal to 5° is also included. The term "substantially parallel" refers to a state where two straight lines are positioned at an angle therebetween being greater than or equal to −30° and less than or equal to 30°, unless otherwise specified. Furthermore, the terms "perpendicular" and "orthogonal" refer to a state where two straight lines are positioned at an angle therebetween being greater than or equal to 80° and less than or equal to 100°, unless otherwise specified. Thus, the case where the angle is greater than or equal to 85° and less than or equal to 95° is also included. The term "substantially perpendicular" refers to a state where two straight lines are positioned at an angle therebetween being greater than or equal to 60° and less than or equal to 120°, unless otherwise specified Note that in this specification and the like, the terms "identical", "the same", "equal", "uniform", or the like (including synonyms thereof) used in describing calculation values and measurement values contain an error of ±20% unless otherwise specified.

Embodiment 1

In this embodiment, an electronic device using a novel optical module will be described with reference to FIG. 1 to FIG. 6.

Figure 1B:
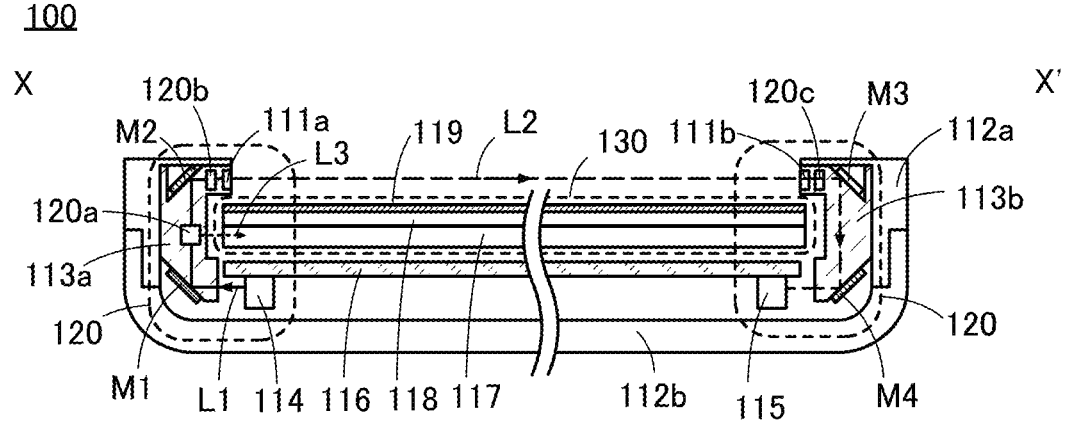

FIGS. 1(A) and 1(B) show an electronic device 100. FIG. 1(A) is a top view of the electronic device 100, and FIG. 1(B) is a cross-sectional view taken along X-X' of the electronic device 100. The electronic device 100 includes an optical module 120, a housing 112, a printed circuit board 116, and a display device 130.

The housing 112 includes a housing 112*a* and a housing 112*b*. The housing 112*a* includes an opening 111, an opening 111*a*, and an opening 111*b*. FIG. 1(A) is the top view of the electronic device 100, so that it shows the housing 112*a*. The display device 130 includes an optical layer 117, a TFT layer 118, and a polarizing layer 119.

The optical module 120 includes a light guide path 113*a*, a light guide path 113*b*, a light-emitting element 114, a light-receiving element 115, an optical conversion element 120*a*, an optical conversion element 120*b*, an optical conversion element 120*c*, a mirror M1, a mirror M2, a mirror M3, and a mirror M4. A control IC or the like for the light-emitting element 114, the light-receiving element 115, and the display device 130 is preferably mounted on the printed circuit board 116. A display surface 130*a* of the display device 130 is preferably placed to overlap with the opening 111. The opening 111*a* is preferably placed in a position opposite the opening 111*b*. The housing 112*a* may have a structure including the light guide path 113*a* and the light guide path 113*b*.

The light-emitting element includes a light-emitting diode and a plurality of fluorescent substances. It is known that light emitted by a light-emitting diode excites a plurality of fluorescent substances and the fluorescent substances emit white light. As for the white light emitted by the fluorescent substances that are excited by light emitted by the light-emitting diode, the emission intensity of any one of wavelengths within a wavelength range longer than 680 nm is preferably greater than the average intensity of emission intensity of a wavelength range from 550 nm to 560 nm. In Patent Document 2 (Japanese Published Patent Application No. 2005-294288), for example, a light-emitting element in which a near-ultraviolet light-emitting diode excites a plurality of fluorescent substances and the plurality of fluorescent substances that are excited emit white light is disclosed.

Light L1 is white light emitted by the fluorescent substances excited by the light-emitting diode, and contains a longer wavelength component than 680 nm. Note that light having a wavelength range longer than 680 nm is known to be light with a wavelength range not perceived by many of humans, because it is perceived with emission intensity of approximately 1/1000 or less of the maximum spectral luminous efficacy.

The light L1 is dispersed, by passing through the optical conversion element 120a and the optical conversion element 120b placed in the light guide path 113a, to be light L2 and light L3. The light L2 is near-infrared light containing a longer wavelength component than 680 nm. The light L3 is white light containing a wavelength component of 680 nm or less.

The light-emitting element 114 and the light-receiving element 115 are preferably placed on the printed circuit board 116 that is placed to overlap with the display device 130. The printed circuit board 116 is preferably placed between the display surface 130a and the housing 112b. The travel direction of the light L1 can be controlled by the mirror M1 to the mirror M4 placed in the light guide path 113a and the light guide path 113b. Thus, the light-receiving element 115 can receive light emitted from the light-emitting element 114.

The mirror M1 can change the travel direction of the light L1 by 90 degrees. Then, the light L1 is dispersed, by the optical conversion element 120a, to be the light L1 and the light L3. The light L1 further travels straight and can change its travel direction by 90 degrees by the mirror M2. The light L1 is dispersed to be the light L2, which contains a longer wavelength component than 680 nm, by the optical conversion element 120b.

The light L1 can change its travel direction by 90 degrees by the mirror included in the optical conversion element 120a. The light L1 is dispersed to be the light L3 that contains a wavelength component of 680 nm or less by an optical filter included in the optical conversion element 120a. The light L3 is supplied to the display device and can be used as a light source of the display device.

The light L2 is emitted, through the opening 111a, parallel to the display surface 130a. The light L2 passes over the display surface 130a and enters the opening 111b. The travel direction of the light L2 entering the opening 111b is changed by 90 degrees by the mirror M3. The travel direction of the light L2 is changed by another 90 degrees by the mirror M4, and the light L2 is supplied to the light-receiving element 115. Thus, the light-receiving element 115 can detect whether or not the light L2 is received.

The optical conversion element 120b is preferably placed between the mirror M2 and the opening 111a. The optical conversion element 120c is preferably placed between the opening 111b and the mirror M3. The optical conversion element 120b and the optical conversion element 120c, allowing only light with the wavelength range required for the light L2 to pass through, can remove light with the other wavelength range (e.g., external light).

Figure 2A:
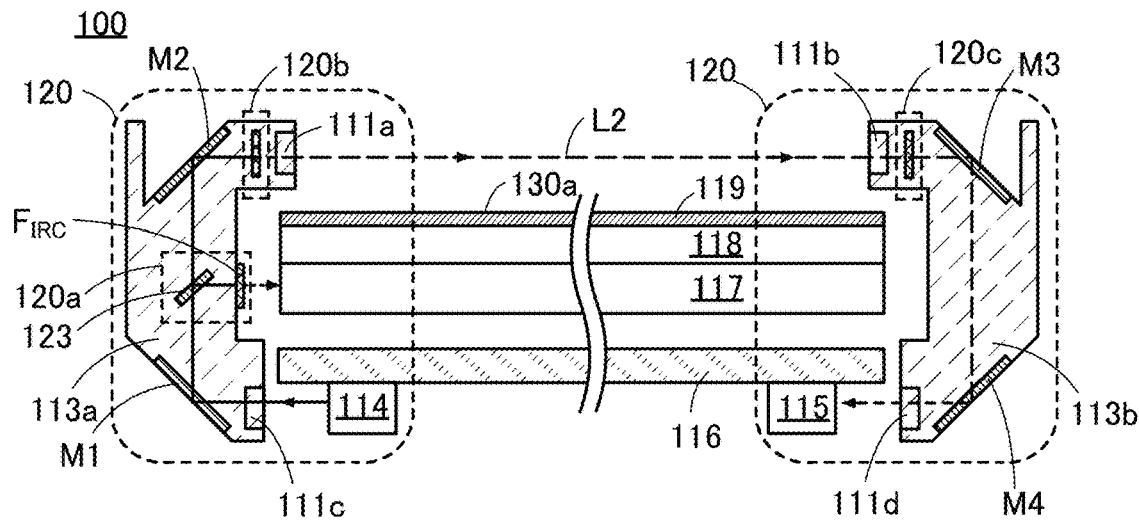
FIG. 2 (A) A cross-sectional view illustrating the configuration of an electronic device. (B) A configuration diagram illustrating an optical module.
Figure 2B:
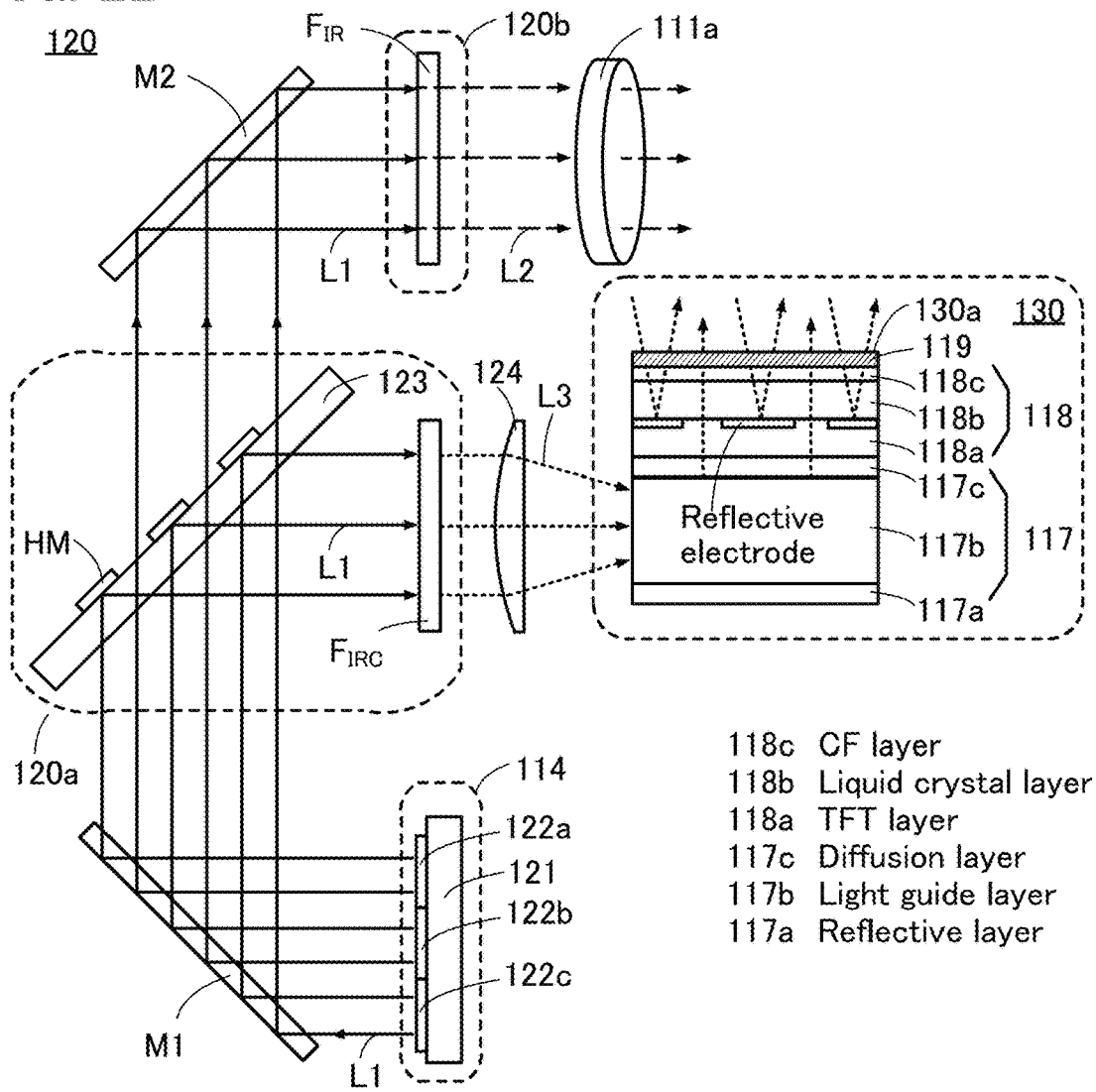

The optical module 120 is described with reference to FIG. 2. In FIG. 2(A), the housing 112a and the housing 112b in FIG. 1(B) are not illustrated. In FIG. 2(B), an example is shown in which the optical conversion element 120a includes a light-transmitting substrate 123, a mirror HM, and an optical filter $F_{IRC}$ and the optical conversion element 120b includes an optical filter $F_{IR}$. The optical conversion element 120b is preferably placed near the opening 111a. Note that the optical conversion element 120b need not necessarily be provided.

First, the display device 130 in FIG. 2(B) will be described. The display device 130 includes a structure of a semi-transmissive liquid crystal display device, as an example. The semi-transmissive liquid crystal display device is excellent in visibility because the luminance of display is changed in response to the brightness of external light. The semi-transmissive liquid crystal display has a feature that the visibility is particularly excellent under sunlight. A decrease in the visibility can be prevented by performing display with the use of transmitted light in a room without sufficient external light, outdoor in the evening or night, or under fluorescent lighting. However, the semi-transmissive liquid crystal display device has a small aperture ratio because it uses reflected light for display, so that displaying with sufficient luminance is difficult. Note that a liquid crystal element is preferably used as the display element when display is performed using reflected light or when display is performed using transmitted light. Note that the display device 130 may be a transmissive liquid crystal display device.

The display device 130 includes the optical layer 117, the TFT layer 118, and the polarizing layer 119. The optical layer 117 includes a reflective layer 117a, a light guide layer 117b, and a diffusion layer 117c. The TFT layer 118 includes a TFT layer 118a, a liquid crystal layer 118b, and a CF layer 118c. Note that a polarizing layer 119a (not shown in the figure) may be provided between the diffusion layer 117c and the TFT layer 118a, as a different example.

It is known that a plurality of polarizing plates are provided in a TN-mode liquid crystal display device, for example. Thus, it is preferable that an optimal number of required polarizing layers 119 is selected in accordance with the display mode of the display device. In addition, the driving method of the liquid crystal display device is not limited to a TN mode, but known driving methods such as an FFS mode, a VA mode, and an OCB mode can be employed.

FIG. 2(B) illustrates a portion of the optical module 120 on the light-emitting side. Note that the light guide path 113a is not illustrated in order to simplify the description. Furthermore, a portion of the optical module 120 on the light-receiving side is described with reference to FIG. 2(A).

The portion of the optical module 120 on the light-emitting side includes the light-emitting element 114, the optical conversion element 120a, the optical conversion element 120b, the mirror M1, the mirror M2, and a lens 124. The light-emitting element 114 includes the light-emitting diode 121, a fluorescent substance 122a, a fluorescent substance 122b, and a fluorescent substance 122c. The fluorescent substance 122a to the fluorescent substance 122c preferably have a function of emitting light with a wavelength different from each other when being excited.

The portion of the optical module 120 on the light-receiving side includes the light-receiving element 115, the optical conversion element 120c, the mirror M3, and the mirror M4.

The sizes of the fluorescent substances are preferably adjusted such that light with different wavelength that is emitted from each of the fluorescent substances becomes white light by being synthesized. In addition, it is preferable that the fluorescent substance 122a to the fluorescent substance 122c be placed such that color unevenness would not be generated in the synthesized white light. For example, the fluorescent substance 122a to the fluorescent substance 122c can be arranged in a tiled pattern.

As illustrated in FIG. 2(A), the travel direction of the light L1 is controlled by the mirror M1 to the mirror M4. The mirror M1 to the mirror M4 are preferably placed such that the light L1 enters the light-receiving element. In FIG. 2(A), the travel direction of light is controlled by the mirror M1 to the mirror M4 each of which is placed at an angle of 45 degrees with respect to the incident direction of light. The optical conversion element 120a is preferably placed between the mirror M1 and the mirror M2.

The substrate 123 included in the optical conversion element 120a has an optical characteristic with which the light L1 is reflected by the mirrors HM in 50% of the area. The substrate 123 is preferably placed at an angle of 45 degrees with respect to the incident direction of the light L1. The substrate 123 has an optical characteristic with which the light L1 is allowed to pass through in the remaining 50% of the area. The mirror HM is preferably formed of a metal film containing as a main component aluminum (Al), silver (Ag), or chromium (Cr), which has a high reflectance.

FIG. 2(B) illustrates an example in which 50% of the area reflects the light L by the mirrors HM placed at regular intervals and the remaining 50% of the area allows the light to pass through and travel straight, for simplifying the description. The mirrors HM may be alternately arranged in a tiled pattern or may be alternately placed in a striped pattern.

The mirror HM is preferably placed on the side of the substrate 123 opposite from the side where the light L1 enters. The surface from which the incident light L1 is reflected is preferably formed by the substrate 123 and the mirror HM firmly sticking to each other. The expression "firmly sticking to each other" refers to a state where the mirror HM is formed on the substrate 123 without any space or gap in a condition where the reflective surface is uniform. With such a structure, a decrease in the reflectance of the reflective surface due to oxidation of the mirror HM or the like can be prevented. In addition, it is preferable that a reflective surface be placed on the opposite side from the side where the light L1 enters in each of the mirror M1 to the mirror M4.

The light L1 entering the substrate 123 is reflected in 50% of the area, in which the mirrors HM are placed, and supplied to the optical filter $F_{IRC}$. The optical filter $F_{IRC}$ allows the light L3 with a wavelength range of 680 nm or less to pass through. Accordingly, the light L3 becomes white light with a wavelength range of 680 nm or lower. The light L3 is collected by the lens 124 and supplied to the light guide layer 117b, and can function as a light source of transmitted light of the display device. Although an example in which 50% of the area, in which the mirrors HM are placed, reflects light is described above, the area in which the mirrors HM reflect the light L1 is not limited to 50%. It is preferable that, in the display device, the area reflecting light be set in accordance with the amount of light required for the light source. However, the optical filter FIRc need not necessary be provided when the light source of the display device is allowed to contain a longer wavelength component than 680 nm.

Next, the side receiving the light L2 will be described with reference to FIG. 2(A). External light, other than the light L2, sometimes enters the opening 111b. Thus, the optical conversion element 120c preferably has a function of removing light in a wavelength range of 680 nm or less from the light entering through the opening 111b. Accordingly, the optical conversion element 120c preferably includes the optical filter $F_{IR}$. In addition, the optical conversion element 120c is preferably placed near the opening 111b.

With the use of the light L2, an obstacle that blocks the optical path over the display surface 130a can be detected. More specifically, in the electronic device 100, the light-receiving element 115 becomes unable to detect the light L2 when a user touches the display surface 130a using his or her finger or a tool such as a stylus, thereby blocking the light path of the light L2. In other words, the optical module 120 achieves the function of supplying the light L3 as the light source of the display device and the function of supplying the light L2 that enables optical touch detection, with the use of the same light-emitting element 114.

The display device 130 can perform display by using external light as the main light source, when used under intense external light such as sunlight. Furthermore, the display device 130 can perform display by using the light L3 as the main light source when external light is not sufficiently intense, e.g., in the evening, night or indoor. Additionally, the display device 130 is capable of touch detection with the use of the light L2. The electronic device 100 can obtain the light source for optical touch detection and the light source for the display device 130 from a single light source. Accordingly, the electronic device 100 can decrease its power consumption regardless of the usage environment.

As the size of the display device 130 increases, the wiring resistance and the parasitic capacitance in the display device 130 increase, resulting in a greater time constant. In a capacitive touch sensor or a resistive touch sensor, an increase in time constant results in an issue of smaller detection signals. That is, an increase in time constant decreases an SN ratio (signal-to-noise ratio). However, with optical touch detection, a decrease in an SN ratio can be prevented even when the size of the display device 130 is increased.

Figure 3:
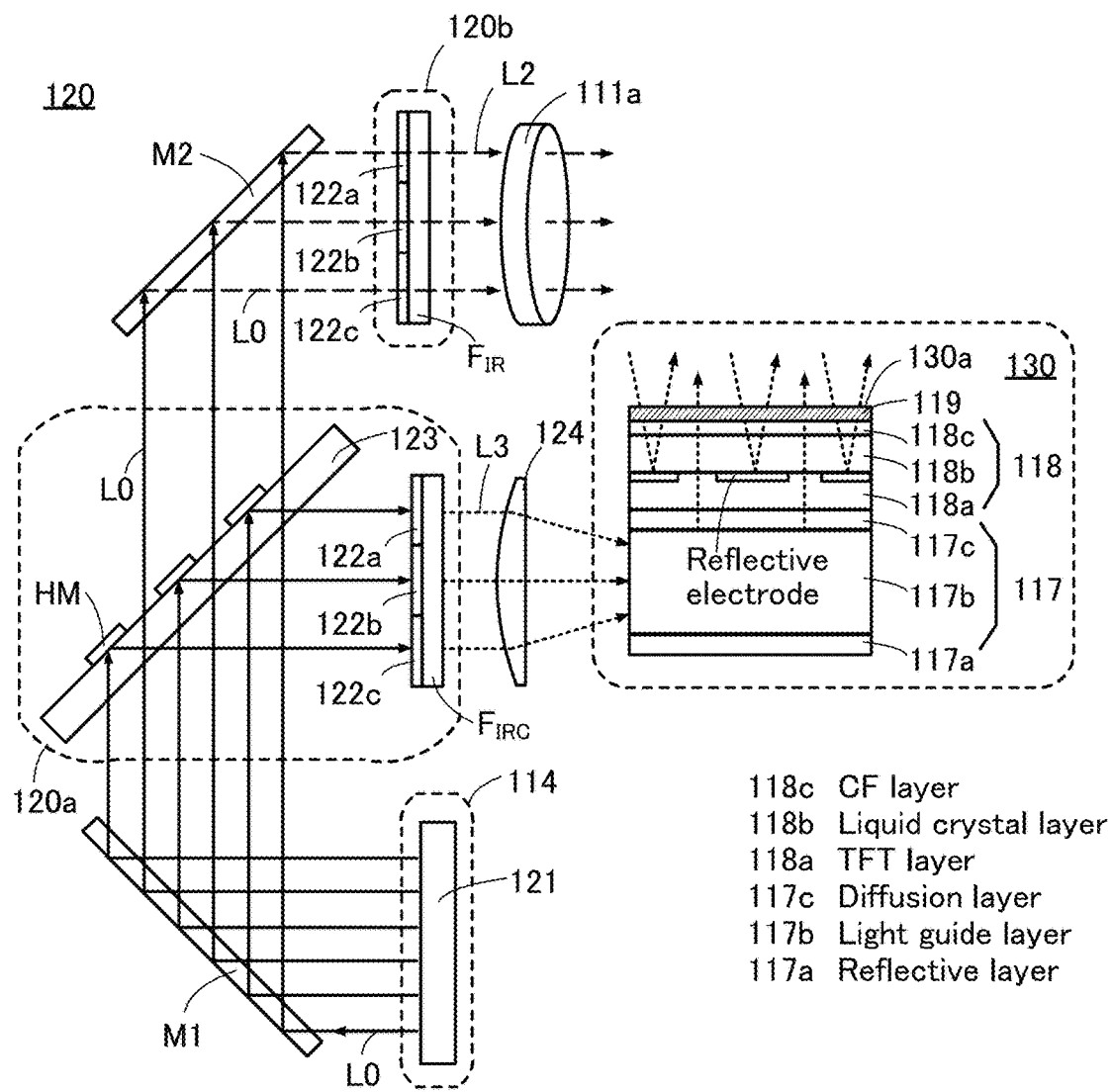
FIG. 3 A configuration diagram illustrating an optical module.

FIG. 3 illustrates an optical module 120 different from that in FIG. 2. In FIG. 3, an example is illustrated in which the optical filter $F_{IRC}$ and the optical filter $F_{IR}$ each include the plurality of fluorescent substances 122a to 122c.

The light-emitting element 114 includes the light-emitting diode 121 and emits light L0 containing a near-ultraviolet wavelength component. The travel direction of the light L0 is controlled by the mirror M1 and the mirrors HM on the optical conversion element 120a and the light L0 is supplied to the optical filter $F_{IRC}$. The light L0 can excite the fluorescent substance 122a to the fluorescent substance 122c. The excited fluorescent substance 122a to fluorescent substance 122c emit the light L1. The optical filter $F_{IRC}$ can block light with a longer wavelength than 680 nm in the light L1 and emit the light L3 with a wavelength range of 680 nm or less. The light L3 is supplied to the lens 124, and light collected by the lens 124 can function as the light source for the display device 130.

Furthermore, the light L0 of which the traveling direction is controlled by the mirror M1 and the mirror M2 is supplied to the optical filter $F_{IR}$. The light L0 can excite each of the fluorescent substance 122a to the fluorescent substance 122c included in the optical conversion element 120b. The excited fluorescent substance 122a to fluorescent substance 122c emit the light L1. The optical filter FIR can block light of 680 nm or less and emit the light L2 with a wavelength range longer than 680 nm.

The portion of the optical module 120 on the light-receiving side has already been described with reference to FIG. 2, and thus is omitted.

Since the optical filter $F_{IRC}$ and the optical filter $F_{IR}$ each include the plurality of fluorescent substances 122a to 122c, loss of optical energy due to the effect of light absorption by the materials of the mirror M1, the mirror M2, and the substrate 123 can be reduced. Materials by which the light L0 would not be absorbed are preferably used as the materials of the mirror M1, the mirror M2, and the substrate 123. The light L0 preferably contains a wavelength component of 400 nm or less.

Figure 4A:
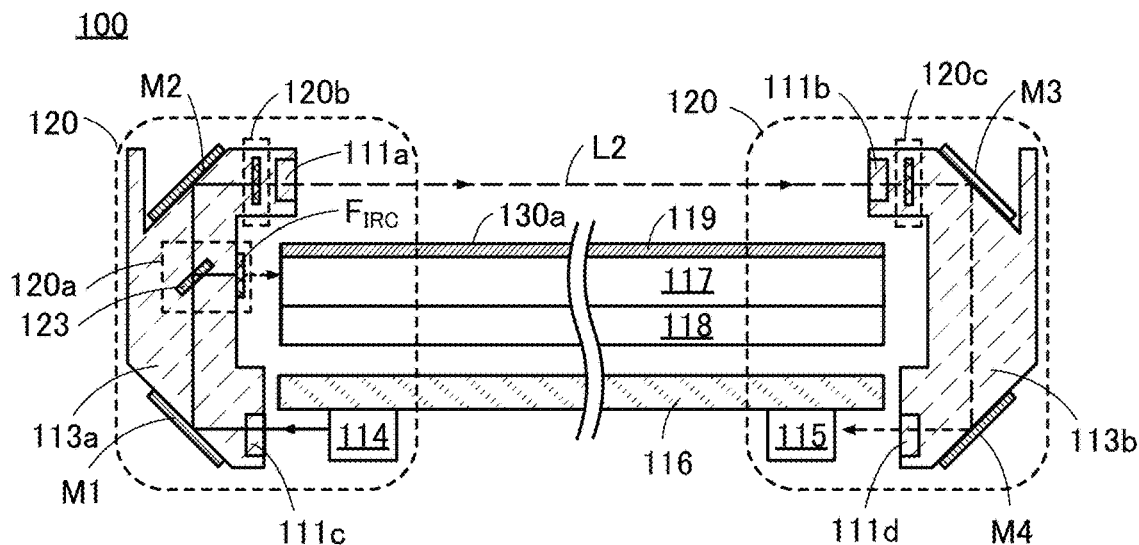
FIG. 4 (A) A cross-sectional view illustrating the configuration of an electronic device. (B) A configuration diagram illustrating an optical module.
Figure 4B:
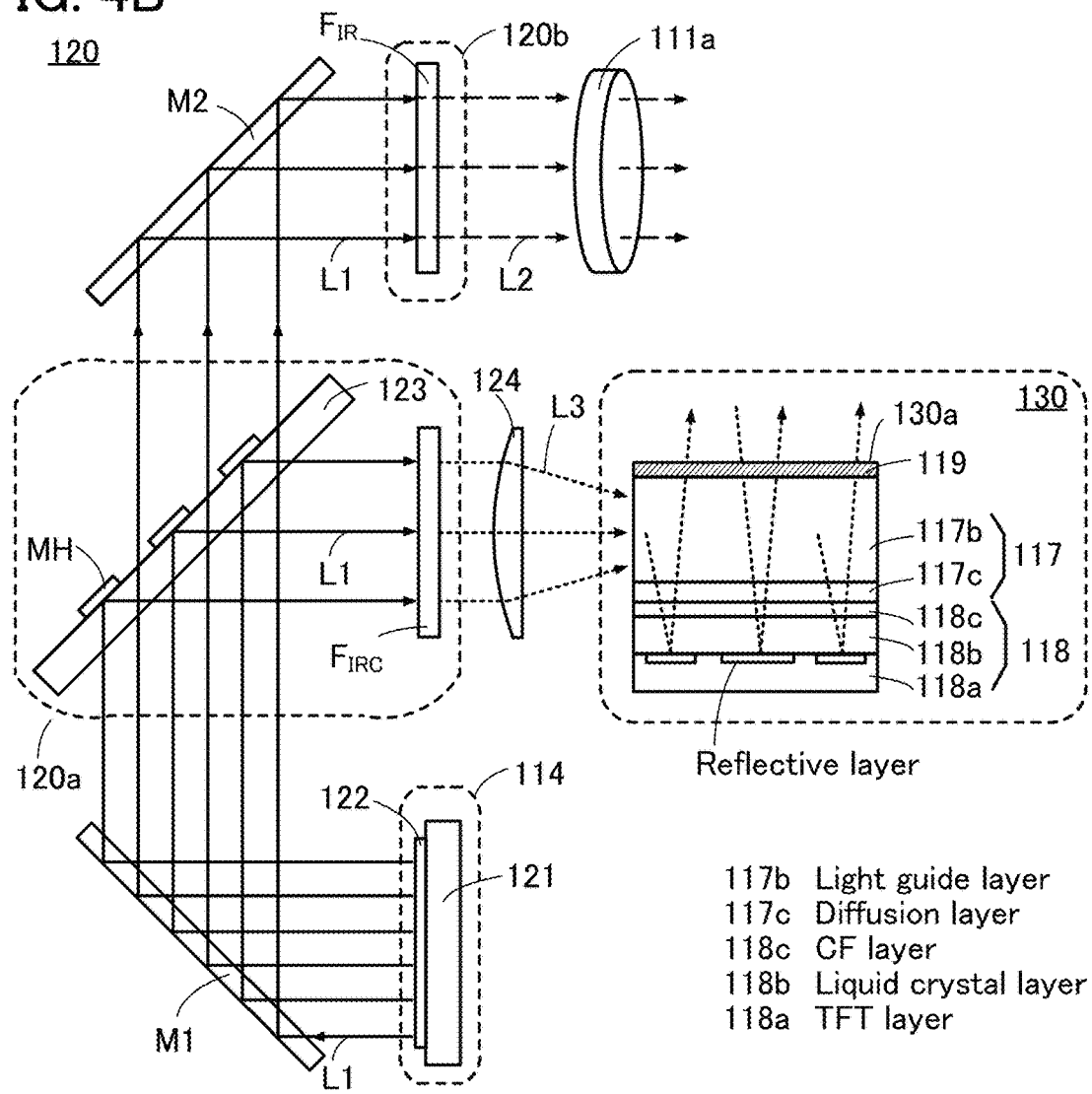

FIGS. 4(A) and 4(B) illustrate an example in which the light L3 is used as a different light source for the display device 130. The display device 130 is a reflective liquid crystal display device, as an example. Unlike the display device 130 in FIG. 2, the optical layer 117 is placed above the TFT layer 118. In other words, the light L3 is supplied to the light guide layer 117b, and the diffusion layer 117c under the light guide layer 117b can diffuse the light L3. The diffused light L3 is reflected by reflective electrodes in the TFT layer 118, and the reflected light L3 can function as the light source for performing display on the display surface 130a by passing through the liquid crystal layer 118b. Note that in FIG. 4(A), the housing 112a and the housing 112b in FIG. 1(B) are not illustrated.

The display device 130 illustrated in FIG. 4 can perform display by reflecting external light that enters the display device 130. Furthermore, the display device 130 can perform display by allowing the light L3 to enter through the side surface of the display device 130. In other words, in FIG. 4, the reflective electrodes reflect the external light and the light L3, whereby display can be performed. Accordingly, the reflective liquid crystal display device illustrated in FIG. 4, in which not only the external light but also the light L3 can be reflected by the reflective electrodes to be used for display, can improve the light extraction efficiency. Furthermore, the light L2 can be used for touch detection of the display surface 130a.

Figure 5A:
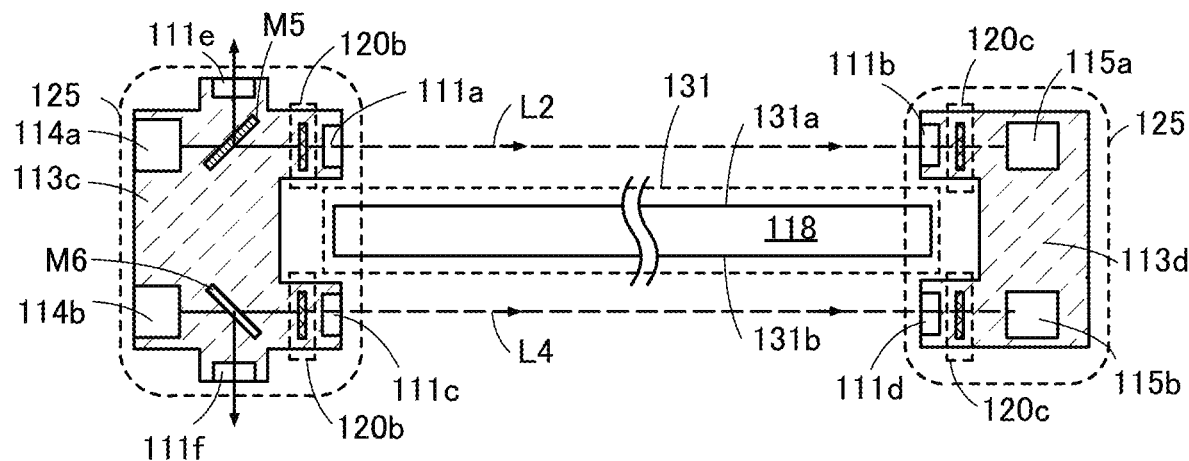
FIG. 5 (A) A cross-sectional view illustrating the configuration of an electronic device. (B) A configuration diagram illustrating an optical module.

An electronic device 100a illustrated in FIG. 5(A) has a structure different from that of the electronic device 100 in FIG. 1. In FIG. 5(A), a display device 131 and an optical module 125 are included. The optical module 125 includes a light guide path 113c, a light guide path 113d, a mirror M5, a mirror M6, a light-emitting element 114a, a light-emitting element 114b, a light-receiving element 115a, a light-receiving element 115b, a plurality of optical conversion elements 120b, and an opening 111a to an opening 111f. Note that in FIG. 5(A), the housing 112a and the housing 112b in FIG. 1(B) are not illustrated.

The display device 131 includes a TFT layer 118, and the TFT layer 118 includes a light-emitting element 118d although not shown in the figure. The light-emitting element 118d is preferably an OLED or an LED. The display device 131 includes a display surface 131a and a display surface 131b. The light-emitting element 118d included in the display device 131 is preferably capable of performing display on the display surface 131a and on the display surface 131b. Furthermore, since display images displayed on the display surface 131a and the display surface 131b are displayed by the same light-emitting element 118d, the display contents are preferably mirror-symmetrically displayed.

In other words, in the electronic device 100a, the display device 131 can display mirror-symmetric images on the front and back sides. When the display device 131 is provided with a capacitive touch panel in the structure of the display device 131 described above, the touch detection on the display surface 131a affects the touch detection on the display surface 131b to cause wrong detection in some cases.

Figure 5B:
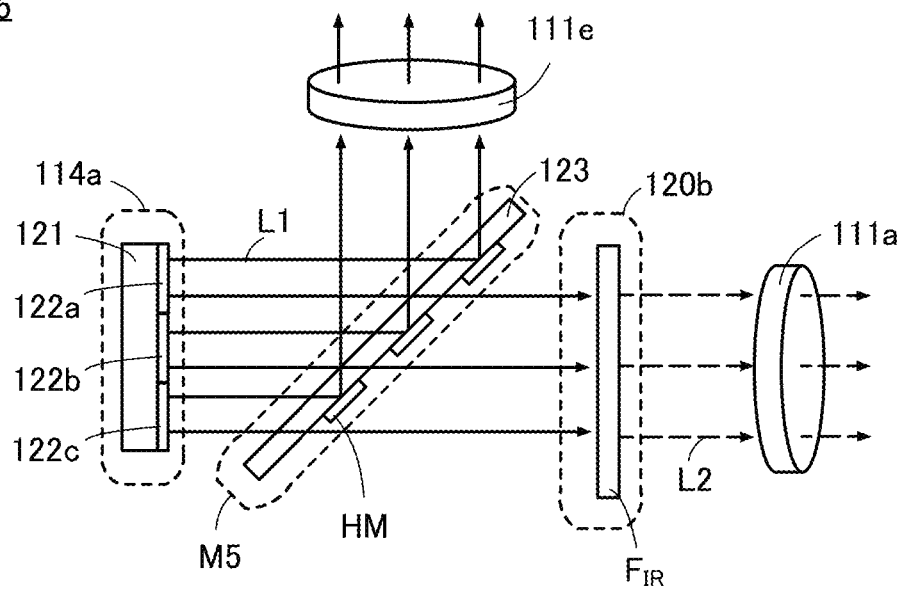

In FIGS. 5(A) and 5(B), the optical module 125 with which the touch detection on the display surface 131a does not affect the touch detection on the display surface 131b are illustrated. The optical module 125 includes a first structure and a second structure. The first structure has a touch detection function for the display surface 131a, and the second structure has a touch detection function for the display surface 131b. The second structure has the same structure as that of the first structure.

In FIG. 5(B), a portion of the first structure on the light-emitting side is illustrated. A portion of the first structure on the light-receiving side is described with reference to FIG. 5(A). The first structure includes the mirror M5, the light-emitting element 114a, the light-receiving element 115a, the optical conversion element 120b, the optical conversion element 120c, the opening 111a, the opening 111b, and an opening 111e. The optical conversion element 120b and the optical conversion element 120c each include the optical filter $F_{IR}$.

The light-emitting element 114a has a function of emitting the light L1. The light L1 enters the mirror M5, and the light L1 is reflected in 50% of the area to be emitted to the opening 111e. The remaining 50% of the light L1 passes through the mirror M5 to travel straight. The optical filter $F_{IR}$ can block the wavelength component of 680 nm or less of the entering light L1 and convert the light L1 into the light L2 with a wavelength range longer than 680 nm. The light L2 passes over the display surface 131a and enters the opening 111b. The light L2 entering the optical filter $F_{IR}$, where the wavelength component of 680 nm or less is removed, is supplied to the light-receiving element 115.

Furthermore, light emitted through the opening 111e can be used as illumination light that illuminates the surrounding area of the electronic device 100a. Although an example in which 50% of the area of the mirror M5 reflects the light and the remaining light passes through the mirror M5 is illustrated, the area that reflects the light is not limited to 50%. It is preferable that, in the display device 100a, the area reflecting light be set in accordance with the amount of light required for the light source of illumination light.

The optical module 125 can provide the touch detection function for the display surface 131a with the first structure, and the touch detection function for the display surface 131b with the second structure. With the structure in FIG. 5(A), even when the display surface 131b is touched while the display surface 131a is being touched, the presence or absence of the touch can be detected at the same time. Note that the touch detection with the first structure is controlled independently of the second structure and thus is not affected by the presence or absence of the touch on the display surface 131b. The display device 131 can detect the presence or absence of the touch well, even when the time constant increases with an increase in the size.

The structure in FIG. 5(A) can be incorporated in a divider of a space (e.g., a door, a window, a wall, a partition of a room or desk), as an example. Furthermore, the display device 131 can be a transparent display device whose backside is visible, by being provided with a region where light can pass through in a pixel formed in the TFT layer.

Figure 6:
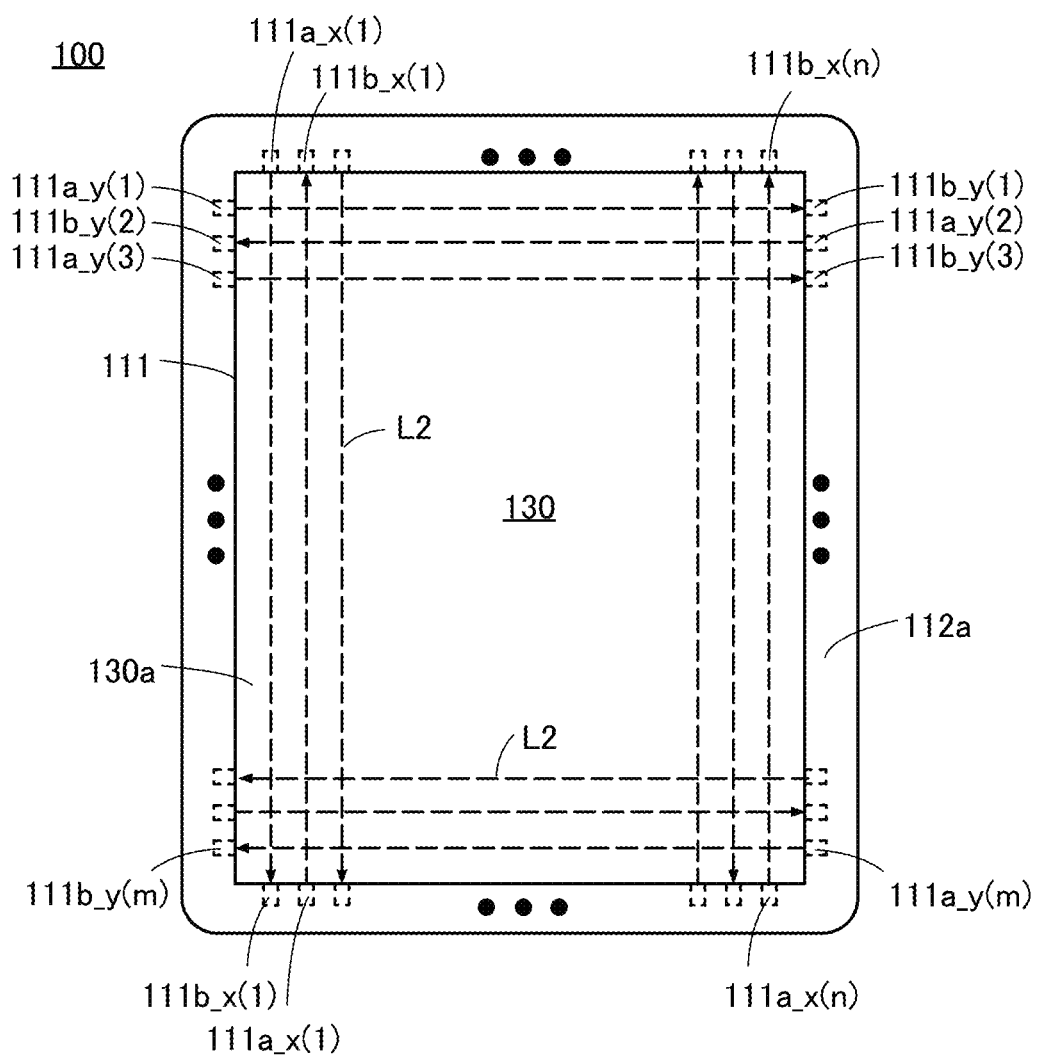
FIG. 6 A diagram illustrating an electronic device.

An electronic device 100 illustrated in FIG. 6 is an example in which the opening 11a and the opening 111b are placed differently from FIG. 1. In FIG. 6, the direction in which the light L2 emitted through the opening 111a enters the opening 111*b* is different between even-numbered lines and odd-numbered lines. Accordingly, regions for mounting the components such as the optical conversion element can be secured by reversing the placement between even-numbered lines and odd-numbered lines, for example. In addition, touch detection response can be improved by performing touch detection for the even-numbered lines from a smaller-numbered row in ascending order and by performing touch detection for the odd-numbered lines from a larger-numbered row in descending order. Furthermore, the light L1 or the light L3 can be utilized as the light source for the display device 130. Alternatively, the light L1 or the light L3 may be used for lighting of the electronic device 100.

Figure 7A:
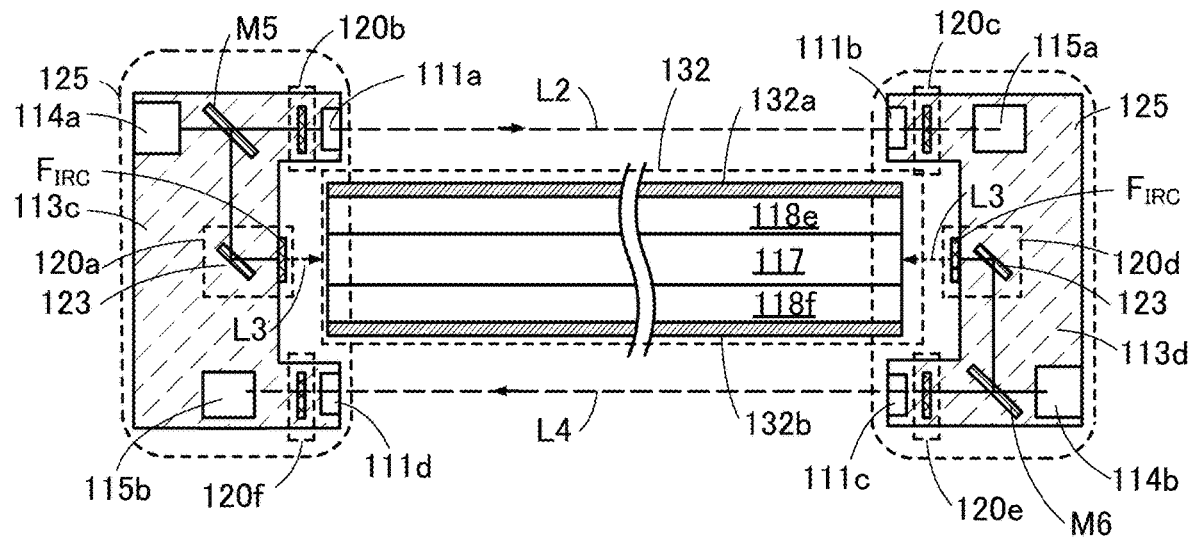
FIG. 7 (A) A cross-sectional view illustrating the configuration of an electronic device. (B) A diagram illustrating the configuration of a display device.
Figure 7B:
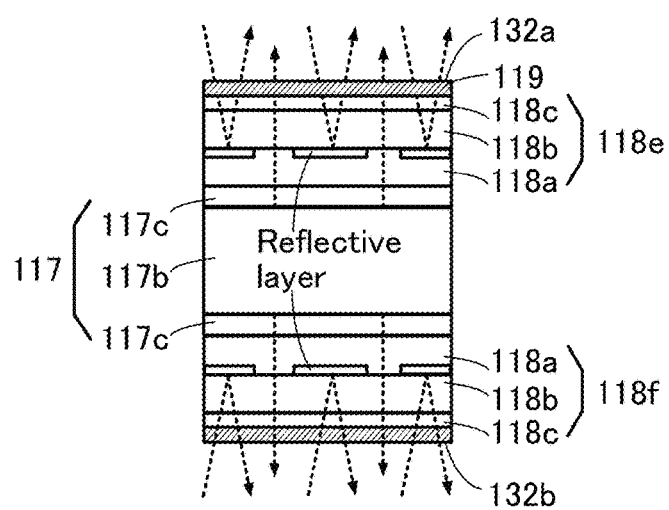

An electronic device 100*b* illustrated in FIG. 7(A) has a structure different from that of the electronic device 100*a* in FIG. 5. In FIG. 7(A), a display device 132 includes a semi-transmissive liquid crystal display device. In FIG. 7(B), the structure of the display device 132 is illustrated. The display device 132 includes a display surface 132*a* and a display surface 132*b*.

The display on the display surface 132*a* is updated by a TFT layer 118*e*, and the display on the display surface 132*b* is updated by a TFT layer 118*f*. The display surface 132*a* and the display surface 132*b* are capable of display with transmitted light using the light L3 supplied to a common optical layer 17 as the light source. What is different from the electronic device 100*a* in FIG. 5 is that the display surface 132*a* can perform display differently from the display surface 132*b*.

Although FIG. 7 illustrates an example in which the optical module 125 includes the first structure and the second structure as in FIG. 5, the light L2 is preferably emitted in a direction different from that of the light L4. When the light L2 is emitted in a direction different from that of the light L4, the light guide layer 117*b* in the optical layer 117 is supplied with the light L3 from different directions. As a result, the luminance of the light source that is used for display can be increased. Furthermore, the display surface 132*a* or the display surface 132*b* supplies the light L3 to the optical layer from an opposite direction, so that a decrease in the uniformity of the luminance of the display region can be prevented even when the display device 132 increases in size.

Note that, in this embodiment, one embodiment of the present invention has been described. Furthermore, in any of the other embodiments, one embodiment of the present invention will be described. However, embodiments of the present invention are not limited thereto. In other words, since various embodiments of the invention are described in this embodiment and the other embodiments, one embodiment of the present invention is not limited to a particular embodiment. Although an example in which one embodiment of the present invention is applied to an electronic device is described, for example, one embodiment of the present invention is not limited thereto. Depending on the case, or according to the circumstances, one embodiment of the present invention need not necessarily be applied to an electronic device.

The structure and method described above in this embodiment can be implemented in combination as appropriate with the structures and methods described in the other embodiments.

Embodiment 2

In this embodiment, a display device of one embodiment of the present invention will be described.

One embodiment of the present invention is a display device including a display region (also referred to as a pixel portion) where a plurality of pixels are arranged in a matrix. For simple description, the display device in Embodiment 1 is described as a transmissive liquid crystal display device. In the pixel portion, a plurality of wirings to which a selection signal is supplied (also referred to as gate lines or scan lines) and a plurality of wirings to which a signal to be written to a pixel (also referred to as a video signal or the like) is supplied (also referred to as source lines, signal lines, data lines, or the like) are provided. Here, the gate lines are provided parallel to one another, the source lines are provided parallel to one another, and the gate lines and the source lines intersect with each other.

One pixel includes at least one transistor and one display element. The display element includes a conductive layer functioning as a pixel electrode, and the conductive layer is electrically connected to one of a source or a drain of the transistor. A gate of the transistor is electrically connected to a gate line, and the other of the source or the drain is electrically connected to a source line.

Here, a direction in which the gate lines extend is called a row direction or a first direction, and a direction in which the source lines extend is called a column direction or a second direction.

Here, two or more adjacent gate lines are preferably supplied with the same selection signal. That is, selection periods of these gate lines are preferably the same. Here, an example in which three gate lines are regarded as a group is used for description. Note that the number of gate lines of which the selection periods are the same is not limited to three, and four gate lines may be regarded as a group. The larger number of gate lines may be regarded as a group.

In the case where the same selection signal is supplied to three gate lines, three pixels which are adjacent to each other in the column direction are concurrently selected. Thus, a configuration in which different source lines are connected to the three pixels is employed. That is, a configuration in which three source lines are arranged for each column is employed.

The source line positioned in the middle among the three source lines is preferably placed to overlap with the conductive layer functioning as a pixel electrode, for example. This can reduce the distance between pixel electrodes.

Furthermore, a configuration is preferably employed in which part of a semiconductor layer of a transistor is provided between the source line positioned on the outer side and the source line positioned in the middle among the three source lines. For example, in the case where first to third source lines are arranged in this order, a configuration is employed in which part of a semiconductor layer of a transistor connected to the first source line and part of a semiconductor layer of a transistor connected to the second source line are positioned between the first source line and the second source line. Furthermore, a configuration is employed in which part of a semiconductor layer of a transistor connected to the third source line is positioned between the second source line and the third source line. Thus, a configuration can be obtained in which a node between each source line and each semiconductor layer does not intersect with another source line. Accordingly, the parasitic capacitance between the source lines can be reduced.

With such a configuration, one horizontal period can be longer than the conventional one. In the case where three gate lines are supplied with the same selection signal, for example, the length of one horizontal period can be tripled. Furthermore, since the parasitic capacitance between the source lines can be reduced, the load of the source lines can be reduced. Thus, even an extremely high-resolution display device with a resolution of 4K, 8K, or the like can be operated with the use of a transistor with a low field-effect mobility. The above-described configuration can also be applied to a large display device with a diagonal screen size of 50 inches or larger, a diagonal screen size of 60 inches or larger, or a diagonal screen size of 70 inches or larger.

More specific examples of the display device will be described below with reference to drawings.

[Configuration Example of Display Device]

Figure 8:
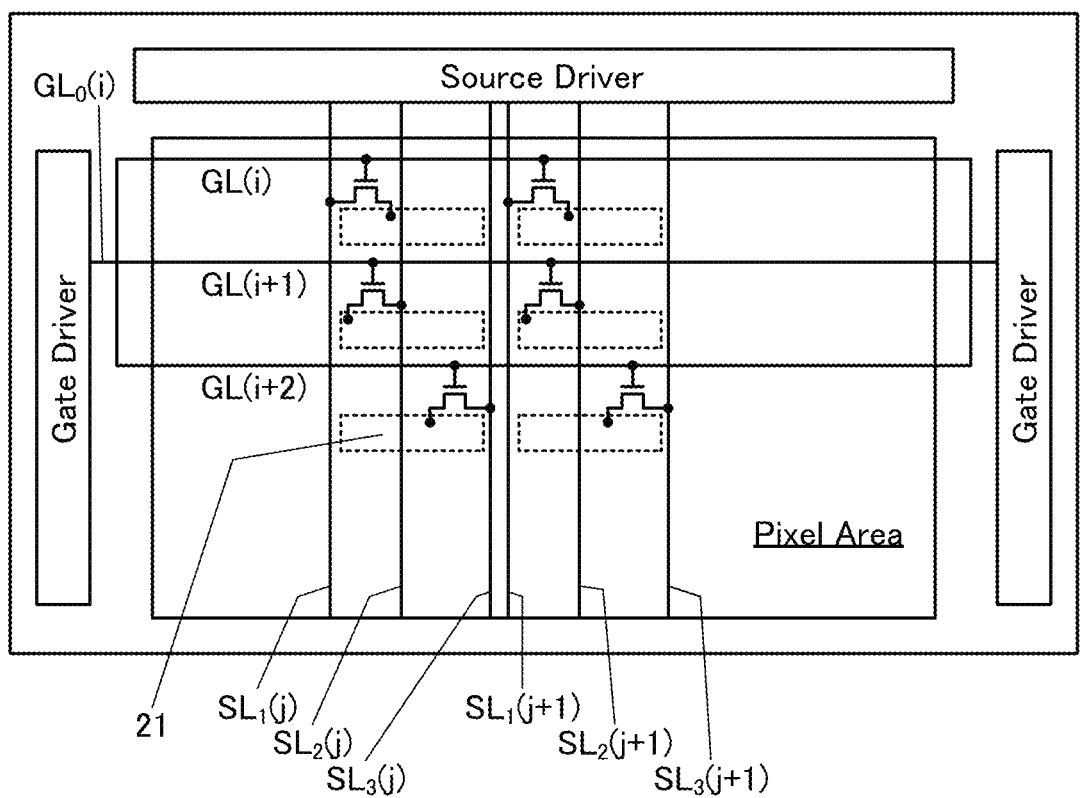
FIG. 8 A diagram illustrating the configuration of a display device.

FIG. 8 shows a block diagram of a display device 1100 of one embodiment of the present invention. The display device 1100 includes a pixel region (a display region. Pixel Area), a source driver, and a gate driver.

FIG. 8 shows an example in which the display device 1100 includes two gate drivers with a pixel region positioned therebetween. A plurality of gate lines $GL_0$ are connected to the two gate drivers. In FIG. 8, an i-th gate line $GL_0(i)$ is illustrated. An example in which the gate line $GL_0(i)$ is electrically connected to three gate lines (a gate line GL(i), a gate line GL(i+1), and a gate line GL(i+2)) is illustrated. Accordingly, these three gate lines are supplied with the same selection signal.

Aplurality of source lines are connected to the source driver. Three source lines are provided for one pixel column. In FIG. 8, three source lines (a source line $SL_1(j)$, a source line $SL_2(j)$, and a source line $SL_3(j)$) for the j-th pixel column and three source lines (a source line $SL_1(j+1)$, a source line $SL_2(j+1)$, and a source line $SL_3(j+1)$) for the (j+1)-th pixel column are illustrated.

One pixel PIX includes at least one transistor and one conductive layer 21 that functions as a pixel electrode of a display element. The pixel PIX is a pixel corresponding to one color. Therefore, in the case where color display is performed by utilizing color mixture of light emitted from a plurality of pixels, the pixel PIX can be called a sub-pixel.

Furthermore, a plurality of pixels aligned in the column direction are preferably pixels emitting light of the same color. In the case where liquid crystal elements are used as display elements, a configuration is employed in which the pixels aligned in the column direction are provided with coloring layers that transmit light of the same color to overlap with the liquid crystal elements.

Here, it is preferable that part of the source line (the source line $SL_2(j)$) positioned in the middle among three source lines for one pixel column overlap with the conductive layer 21. Moreover, it is preferable that the source line $SL_2(j)$ be arranged at the center portion of the conductive layer 21 so as to be apart from the other source lines. For example, the source line $SL_2(j)$ is preferably arranged such that the distance between the source line $SL_1(j)$ and the source line $SL_2(j)$ is approximately equal to the distance between the source line $SL_2( )$ and the source line $SL_3(j)$. As a result, the parasitic capacitance generated between the source lines can be reduced more effectively and the load of each source line can be reduced.

Here, when using a transistor including amorphous silicon or the like, with which increasing field-effect mobility is difficult, a method in which a display region of a display device is divided into a plurality of pixel regions to be driven can be given as a method for achieving high resolution.

However, in the case of the above method, a boundary portion between the divided pixel regions might be visually recognized because of, for example, variation in characteristics of driver circuits, which decreases the visibility in some cases. In addition, image processing or the like for dividing in advance image data to be input is necessary; thus, a high-speed and large-scale image processing device is required.

By contrast, the display device of one embodiment of the present invention can be driven without dividing the display region even in the case where a transistor with a relatively low field-effect mobility is used.

Although FIG. 8 shows an example in which a source driver is arranged along a side of a pixel region, source drivers may be arranged along facing two sides of the pixel region so as to sandwich the pixel region.

Figure 9:
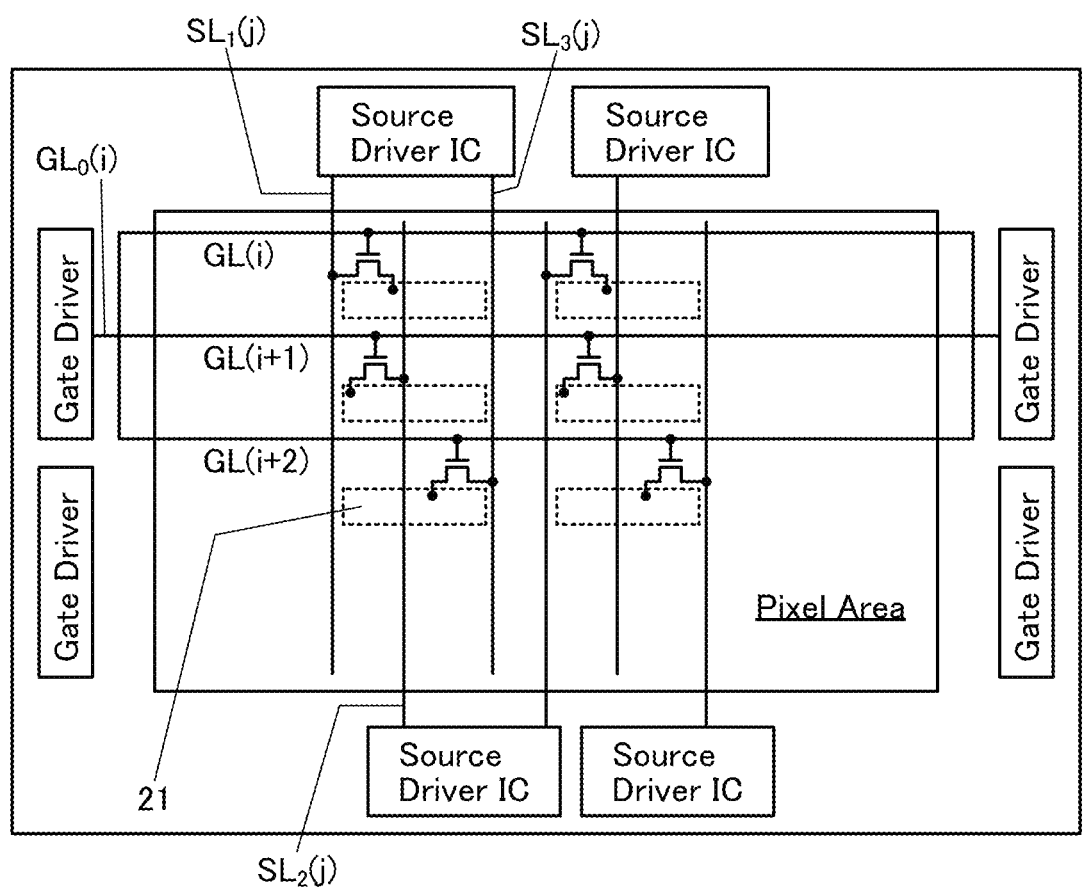
FIG. 9 A diagram illustrating the configuration of a display device.

In FIG. 9, an example is illustrated in which a source driver IC connected to odd-numbered source lines among a plurality of source lines provided in a pixel region and a source driver IC connected to even-numbered source lines are positioned to face each other. That is, a configuration is employed in which the plurality of source lines arranged in the row direction are alternately connected to different source driver ICs. FIG. 9 shows the example in which the source line $SL_1(j)$ and the source line $SL_3(j)$ are connected to the source driver IC on the upper side, and the source line $SL_2(j)$ is connected to the source driver IC on the lower side. With such a configuration, display unevenness due to a potential drop caused by wiring resistance can be suppressed even in a large display device. Furthermore, with the configuration of FIG. 9, the area where the source driver IC is arranged can be larger than that in the configuration of FIG. 8: thus, the distance between two adjacent source driver ICs can be increased, and the manufacturing yield can be improved.

[Pixel Configuration Example]

A configuration example of the pixels arranged in the pixel region of the display device 1100) will be described below.

Figure 10A:
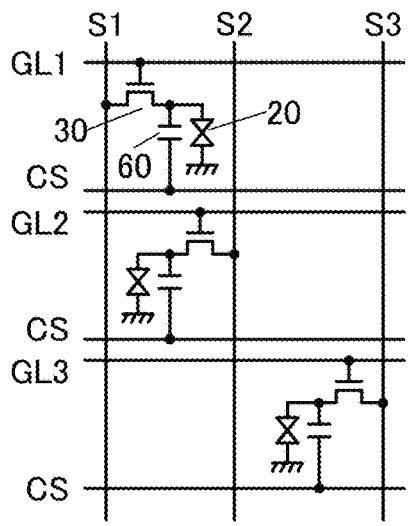
FIG. 10 Diagrams each illustrating the configuration of a display device.

FIG. 10(A) shows a circuit diagram including three pixels arranged in the column direction.

One pixel includes a transistor 30, a liquid crystal element 20, and a capacitor 60.

Wirings S1 to S3 each correspond to a source line, and wirings GL1 to GL3 each correspond to a gate line. A wiring CS is electrically connected to one electrode of the capacitor 60, and is supplied with a predetermined potential.

A pixel is electrically connected to any one of the wirings S1 to S3 and any one of the wirings GL1 to GL3. A pixel that is connected to the wiring S1 and the wiring GL1 is described as an example. In the transistor 30, a gate is electrically connected to the wiring GL1, one of a source or a drain thereof is electrically connected to the wiring S1, and the other of the source or the drain thereof is electrically connected to the other electrode of the capacitor 60 and one electrode (pixel electrode) of the liquid crystal element 20. A common potential is supplied to the one electrode of the capacitor 60.

Figure 10B:
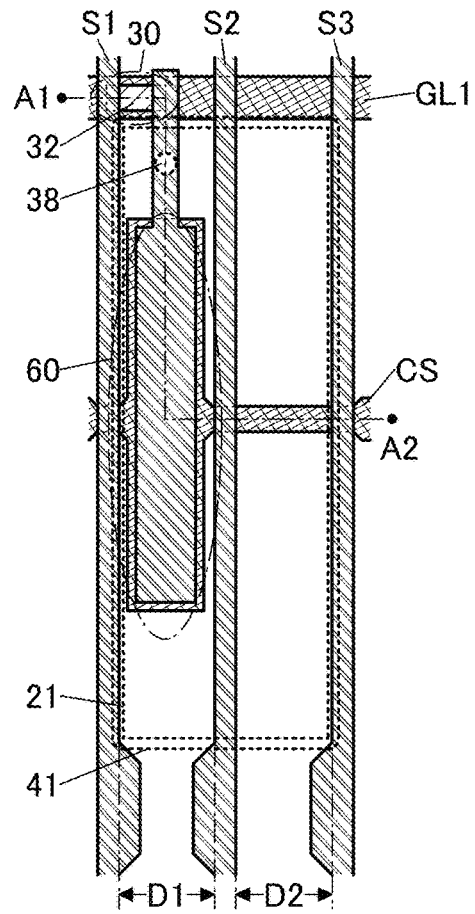

FIG. 10(B) illustrates an example of a layout of the pixel connected to the wiring S1 and the wiring GL1.

As illustrated in FIG. 10(B), the wiring GL1 and the wiring CS extend in the row direction (the lateral direction), and the wirings S1 to S3 extend in the column direction (the longitudinal direction).

In the transistor 30, a semiconductor layer 32 is provided over the wiring GL1, and part of the wiring GL1 functions as a gate electrode. Part of the wiring S1 functions as one of the source electrode or the drain electrode. The semiconductor layer 32 includes a region positioned between the wiring S1 and the wiring S2.

The other of the source electrode or the drain electrode of the transistor 30 is electrically connected to the conductive layer 21 that functions as a pixel electrode through a connection portion 38. A coloring layer 41 is provided in a position overlapping with the conductive layer 21.

The conductive layer 21 includes a portion overlapping with the wiring S2. It is preferable that the conductive layer 21 not overlap with the wiring S1 and the wiring S3 which are positioned along the both sides. Thus, the parasitic capacitance of the wiring S1 and the wiring S3 can be reduced.

Here, when the distance between the wiring S and the wiring S2 is a distance D1 and the distance between the wiring S2 and the wiring S3 is a distance D2, the distance D1 is preferably approximately equal to the distance D2. For example, the ratio of the distance D1 to the distance D2 is 0.8 to 1.2 inclusive, preferably 0.9 to 1.1 inclusive. This can reduce the parasitic capacitance between the wiring S1 and the wiring S2 and the parasitic capacitance between the wiring S2 and the wiring S3.

Owing to an increased distance between wirings, dust or the like that adheres between the wirings in the manufacturing process is easily removed by washing, so that the yield can be improved. When a line washing apparatus is used as a washing method, it is preferable that washing be performed while a substrate is moved along the direction in which the wiring S and the like extend, in which case dust can be removed more easily.

Furthermore, in FIG. 10(B), parts of the wirings S1 to S3 and part of the wiring CS each have a portion wider than the other portion. Thus, the wiring resistance can be small.

Figure 10C:
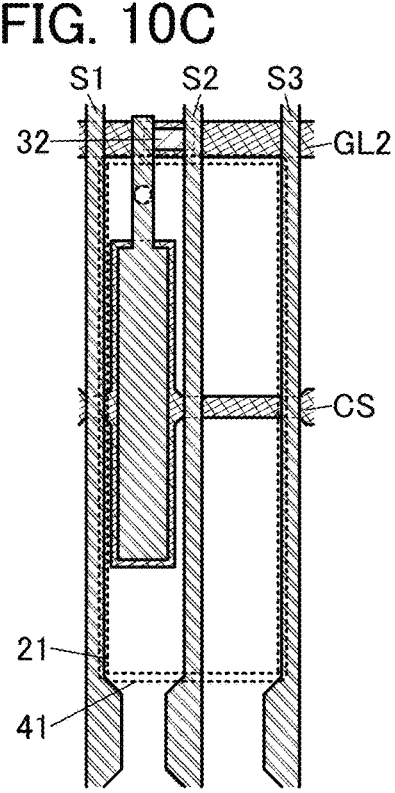
Figure 10D:
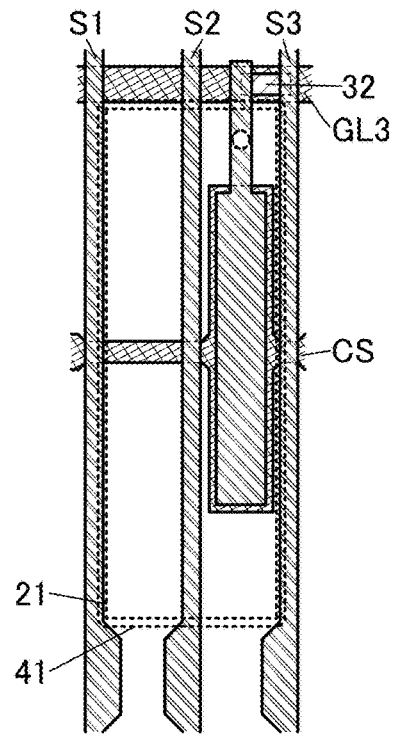

FIGS. 10(C) and 10(D) illustrate examples of layouts of the pixel connected to the wiring GL2 and the pixel connected to the wiring GL3, respectively.

In FIG. 10(C), the semiconductor layer 32 provided over the wiring GL2 is electrically connected to the wiring S2, and has a region positioned between the wiring S1 and the wiring S2.

In FIG. 10(D), the semiconductor layer 32 provided over the wiring GL3 is electrically connected to the wiring S3, and has a region positioned between the wiring S2 and the wiring S3.

The pixels illustrated in FIGS. 10(B), 10(C), and 10(D) are preferably pixels that emit light of the same color. The coloring layers 41 that transmit light of the same color can be provided over regions overlapping with the conductive layers 21. Pixels that are adjacent in the column direction can have the same configuration as those of FIGS. 10(B), 10(C), and 10(D); however, only the coloring layers 41 emit light of different colors.

[Cross-Sectional Structure Example]

Examples of a cross-sectional structure of the display device will be described below.

[Cross-Sectional Structure Example 1]

Figure 11:
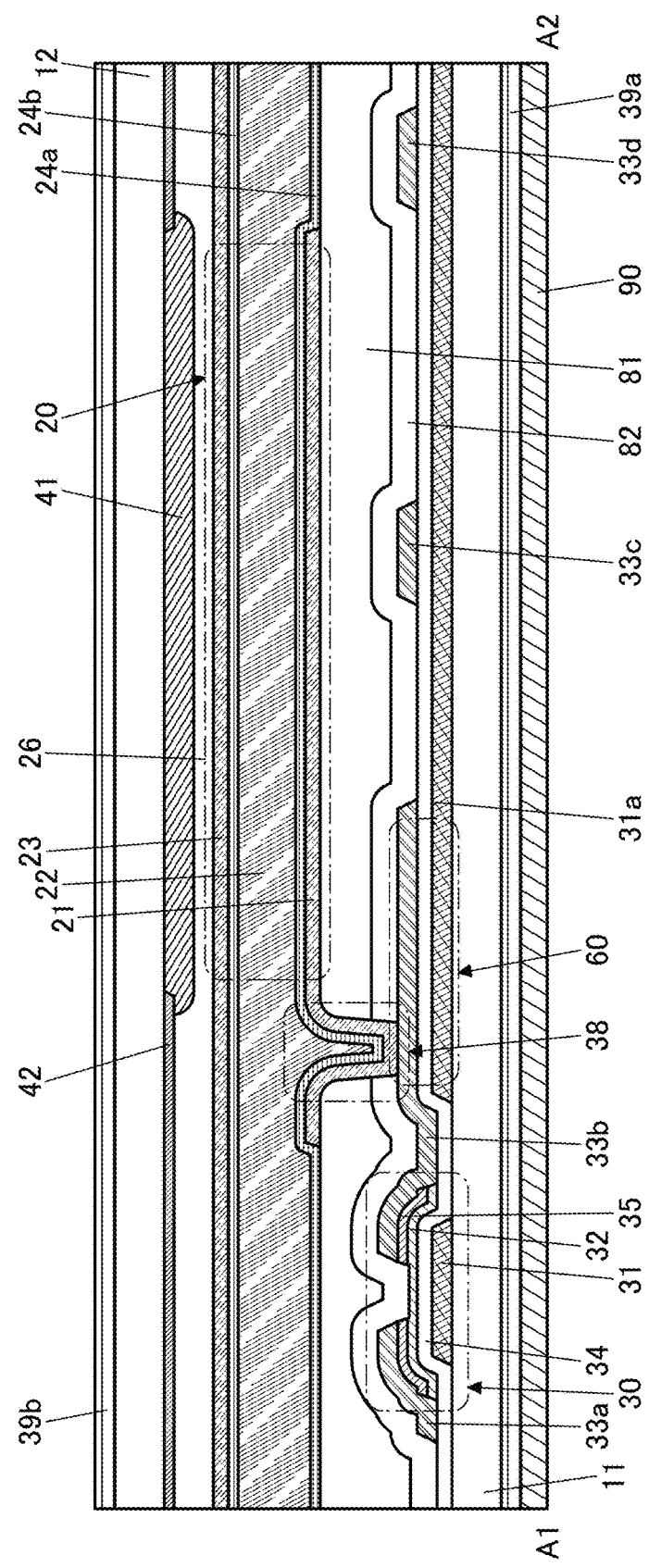
FIG. 11 A diagram illustrating the structure of a display device.

FIG. 11 illustrates an example of a cross section along cutting line A1-A2 in FIG. 10(B). Here, an example of the case where a transmissive liquid crystal element 20 is used as a display element is shown. In FIG. 11, a display surface is on a substrate 12 side.

The display device 1100 has a structure in which a liquid crystal 22 is placed between a substrate 11 and the substrate 12. The liquid crystal element 20 includes the conductive layer 21 provided on the substrate 11 side, a conductive layer 23 provided on the substrate 12 side, and the liquid crystal 22 provided therebetween. Furthermore, an alignment film 24a is provided between the liquid crystal 22 and the conductive layer 21, and an alignment film 24b is provided between the liquid crystal 22 and the conductive layer 23.

The conductive layer 21 functions as a pixel electrode. The conductive layer 23 functions as a common electrode or the like. The conductive layer 21 and the conductive layer 23 each have a function of transmitting visible light. Thus, the liquid crystal element 20 is a transmissive liquid crystal element.

A coloring layer 41 and a light-blocking layer 42 are provided on a surface of the substrate 12 on the substrate 11 side. An insulating layer 26 is provided to cover the coloring layer 41 and the light-blocking layer 42, and the conductive layer 23 is provided to cover the insulating layer 26. The coloring layer 41 is provided in a region overlapping with the conductive layer 21. The light-blocking layer 42 is provided to cover a transistor 30 and a connection portion 38.

A polarizing plate 39a is placed on the outer side of the substrate 11, and a polarizing plate 39b is placed on the outer side of the substrate 12. Furthermore, a backlight unit 90 is provided on the outer side of the polarizing plate 39a.

The transistor 30, the capacitor 60, and the like are provided over the substrate 11. The transistor functions as a selection transistor of a pixel. The transistor 30 is electrically connected to the liquid crystal element 20 through the connection portion 38.

The transistor 30 illustrated in FIG. 11 is a transistor that has what is called a bottom-gate channel-etched structure. The transistor 30 includes a conductive layer 31 functioning as a gate electrode, an insulating layer 34 functioning as a gate insulating layer, the semiconductor layer 32, a pair of impurity semiconductor layers 35 functioning as a source region and a drain region, and paired conductive layer 33a and conductive layer 33b functioning as a source electrode and a drain electrode. A portion of the semiconductor layer 32 overlapping the conductive layer 31 functions as a channel formation region. The semiconductor layer 32 and the impurity semiconductor layers 35 are provided in contact with each other, and the impurity semiconductor layer 35 is provided in contact with the conductive layer 33a or the conductive layer 33b.

Note that the conductive layer 31 corresponds to part of the wiring GL1 in FIG. 10(B), and the conductive layer 33a corresponds to part of the wiring S1. Furthermore, a conductive layer 31a, a conductive layer 33c, and a conductive layer 33d, which will be described later, correspond to the wiring CS, the wiring S2, and the wiring S3, respectively.

A semiconductor containing silicon is preferably used for the semiconductor layer 32. For example, amorphous silicon, microcrystalline silicon, polycrystalline silicon, or the like can be used. It is particularly preferable that amorphous silicon be used since it can be formed over a large substrate with a high yield. The display device of one embodiment of the present invention can perform favorable display even with a transistor that uses amorphous silicon having relatively low field-effect mobility. In the case where amorphous silicon is used, hydrogenated amorphous silicon (denoted by a-Si:H in some cases) in which dangling bonds are terminated by hydrogen is preferably used.

An impurity semiconductor film to form the impurity semiconductor layer 35 is formed using a semiconductor to which an impurity element imparting one conductivity type is added. In the case where the transistor is of n-type, silicon to which P or As is added can be given as an example of the semiconductor to which an impurity element imparting one conductivity type is added. In the case where the transistor is of p-type, it is possible to add B as the impurity element imparting one conductivity type, for example; however, it is preferable that the transistor be of n-type. Note that the impurity semiconductor layers 35 may be formed using an amorphous semiconductor or may be formed using a crystalline semiconductor such as a microcrystalline semiconductor.

The capacitor 60 is made up of the conductive layer 31a, the insulating layer 34, and the conductive layer 33b. Furthermore, the conductive layer 33c and the conductive layer 33d are provided over the conductive layer 31a with the insulating layer 34 therebetween.

An insulating layer 82 and an insulating layer 81 are stacked to cover the transistor 30 and the like. The conductive layer 21 functioning as a pixel electrode is provided over the insulating layer 81. In the connection portion 38, the conductive layer 21 and the conductive layer 33b are electrically connected through an opening provided in the insulating layer 81 and the insulating layer 82. The insulating layer 81 preferably functions as a planarization layer. The insulating layer 82 preferably has a function of a protective film that inhibits diffusion of impurities or the like to the transistor 30 and the like. An inorganic insulating material can be used for the insulating layer 82, and an organic insulating material can be used for the insulating layer 81, for example.

[Cross-Sectional Structure Example 3]

An example of a vertical electric field mode liquid crystal element in which a pair of electrodes that sandwich the liquid crystal are provided at the top and bottom are shown above as the liquid crystal element; however, the structure of the liquid crystal element is not limited thereto and liquid crystal elements of various modes can be used.

Figure 12:
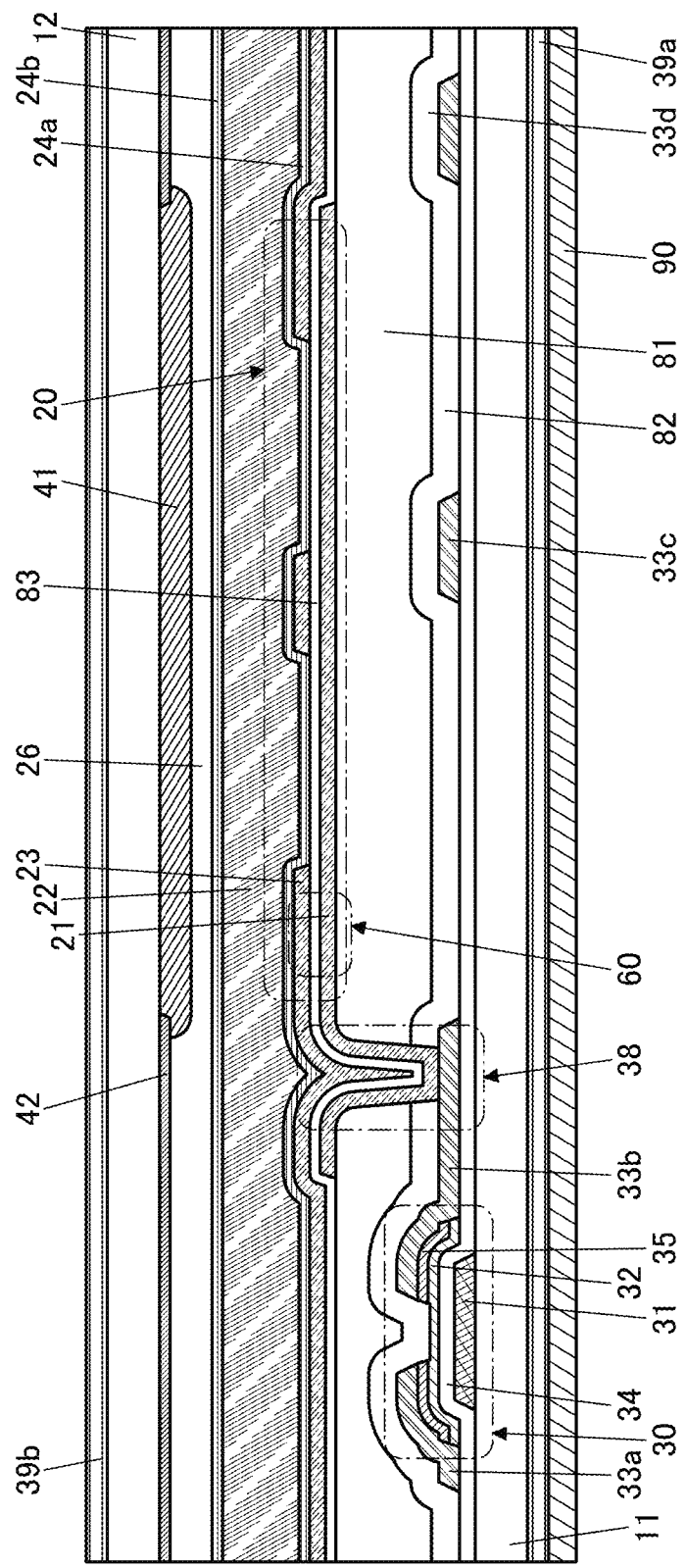
FIG. 12 A diagram illustrating the structure of a display device.

FIG. 12 shows a schematic cross-sectional view of a display device including a liquid crystal element employing an FFS (Fringe Field Switching) mode.

The liquid crystal element 20 includes the conductive layer 21 functioning as a pixel electrode and the conductive layer 23 overlapping with the conductive layer 21 with an insulating layer 83 therebetween. The conductive layer 23 has a slit-like or comb-like top surface shape.

In this structure, capacitance is formed in a portion where the conductive layer 21 and the conductive layer 23 overlap with each other, and this can be used as the capacitor 60. Thus, the area occupied by the pixel can be reduced, so that a high-resolution display device can be achieved. Moreover, the aperture ratio can be improved.

In manufacturing a display device, the smaller the number of photolithography steps in a manufacturing process is, i.e., the smaller the number of photomasks is, the lower the manufacturing cost can be.

The structure illustrated in FIG. 11 can be manufactured, for example, through five photolithography steps in total among steps on the substrate 11 side, which are a step of forming the conductive layer 31 and the like, a step of forming the semiconductor layer 32 and the impurity semiconductor layer 35, a step of forming the conductive layer 33a and the like, a step of forming an opening to be the connection portion 38, and a step of forming the conductive layer 21. That is, a backplane substrate can be manufactured with five photomasks. Meanwhile, on the substrate 12 (counter substrate) side, an ink-jet method, a screen printing method, or the like is preferably used as the methods for forming the coloring layer 41 and the light-blocking layer 42, in which case a photomask becomes unnecessary. In the case where three-color coloring layers 41 and the light-blocking layer 42 are provided using an ink-jet method, a screen printing method, or the like, for example, the number of photomasks can be reduced by four in total, compared with the case where they are formed by a photolithography method.

The above is the description of the cross-sectional structure examples.

[Structure of Transistor]

An example of a structure of a transistor, which is different from the above, will be described below.

Figure 13A:
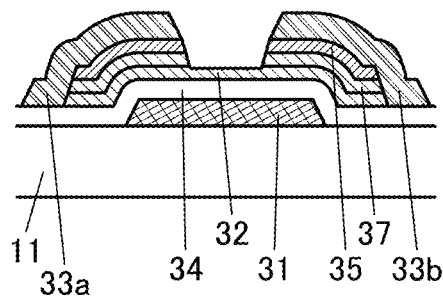
FIG. 13 Diagrams each illustrating the structure of a transistor.

A transistor illustrated in FIG. 13(A) includes a semiconductor layer 37 between the semiconductor layer 32 and the impurity semiconductor layers 35.

The semiconductor layer 37 may be formed using the same semiconductor film as the semiconductor layer 32. The semiconductor layer 37 can function as an etching stopper for preventing the semiconductor layer 32 from disappearing by etching in the etching of the impurity semiconductor layer 35. Note that although FIG. 13(A) illustrates an example where the semiconductor layer 37 is divided into a right portion and a left portion, part of the semiconductor layer 37 may cover a channel formation region of the semiconductor layer 32.

Furthermore, the semiconductor layer 37 may contain an impurity at a concentration lower than that in the impurity semiconductor layer 35. Thus, the semiconductor layer 37 can function as an LDD (Lightly Doped Drain) region, so that hot-carrier degradation at the time when the transistor is driven can be suppressed.

Figure 13B:
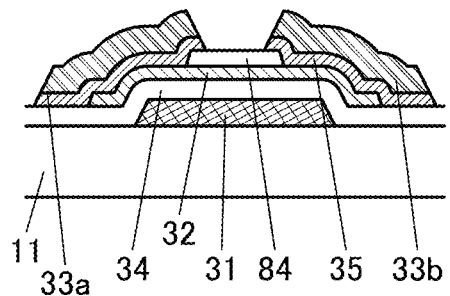

In a transistor illustrated in FIG. 13(B), an insulating layer 84 is provided over the channel formation region of the semiconductor layer 32. The insulating layer 84 functions as an etching stopper in the etching of the impurity semiconductor layer 35.

Figure 13C:
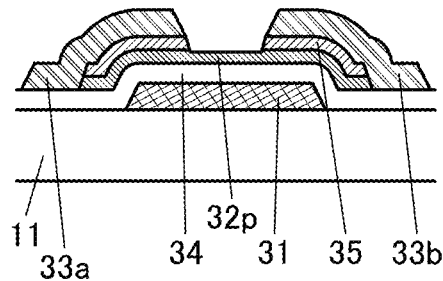

A transistor illustrated in FIG. 13(C) includes a semiconductor layer 32p instead of the semiconductor layer 32. The semiconductor layer 32p includes a semiconductor film having high crystallinity. For example, the semiconductor layer 32p contains a polycrystalline semiconductor or a single crystal semiconductor. Thus, a transistor having a high field-effect mobility can be provided.

Figure 13D:
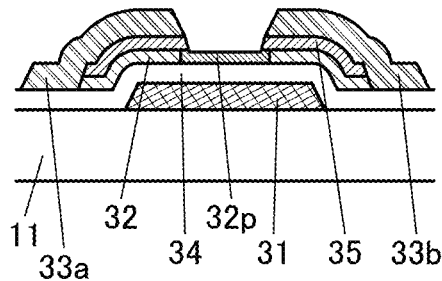

A transistor illustrated in FIG. 13(D) includes the semiconductor layer 32p in the channel formation region of the semiconductor layer 32. The transistor illustrated in FIG. 13(D) can be formed by irradiating a semiconductor film to be the semiconductor layer 32 with laser light or the like so that crystallization is caused locally, for example. Thus, a transistor having a high field-effect mobility can be provided.

Figure 13E:
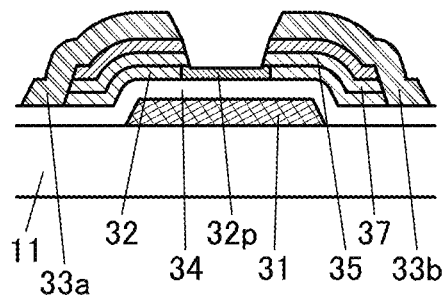

A transistor illustrated in FIG. 13(E) includes the crystalline semiconductor layer 32p in the channel formation region of the semiconductor layer 32 of the transistor illustrated in FIG. 13(A).

Figure 13F:
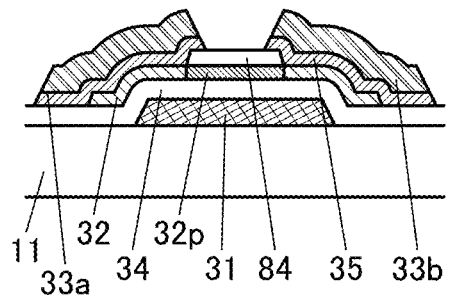

A transistor illustrated in FIG. 13(F) includes the crystalline semiconductor layer 32p in the channel formation region of the semiconductor layer 32 of the transistor illustrated in FIG. 13(B).

The above is the description of structure examples of the transistor.

[Components]

Each of the components mentioned above will be described below.

[Substrate]

A material having a flat surface can be used as the substrate included in the display panel. For the substrate through which light from the display element is extracted, a material that transmits the light is used. For example, a material such as glass, quartz, ceramic, sapphire, or an organic resin can be used.

The weight and thickness of the display panel can be decreased by using a thin substrate. Furthermore, a flexible display panel can be obtained by using a substrate that is thin enough to have flexibility. A glass or the like that is thin enough to have flexibility can also be used as the substrate. A composite material where glass and a resin material are attached to each other with an adhesive layer may also be used.

[Transistor]

The transistors each include a conductive layer functioning as a gate electrode, a semiconductor layer, a conductive layer functioning as a source electrode, a conductive layer functioning as a drain electrode, and an insulating layer functioning as a gate insulating layer.

Note that there is no particular limitation on the structure of the transistor included in the display device of one embodiment of the present invention. A planar transistor, a staggered transistor, or an inverted staggered transistor may be used, for example. A top-gate or bottom-gate transistor structure may be used. Gate electrodes may be provided above and below a channel.

There is no particular limitation on the crystallinity of a semiconductor material used for the transistors, and any of an amorphous semiconductor or a semiconductor having crystallinity (a microcrystalline semiconductor, a polycrystalline semiconductor, a single-crystal semiconductor, and a semiconductor partly including crystal regions) may be used. A semiconductor having crystallinity is preferably used, in which case deterioration of the transistor characteristics can be suppressed.

Silicon, for example, can be used as a semiconductor in which a channel of the transistor is formed. It is particularly preferable to use amorphous silicon as silicon. By using amorphous silicon, transistors can be formed over a large substrate with a high yield, resulting in excellent mass productivity.

Silicon having crystallinity, such as microcrystalline silicon, polycrystalline silicon, or single crystal silicon, can also be used. In particular, polycrystalline silicon can be formed at a lower temperature than single crystal silicon and has higher field-effect mobility and higher reliability than amorphous silicon.

Alternatively, a metal oxide may be used for the semiconductor layer of the transistor. A transistor including a metal oxide in a semiconductor layer is known to have a low off-state current. When a transistor with a low off-state current is used as a selection transistor in a pixel, deterioration in display quality can be suppressed even with a lowered display refresh rate. Accordingly, the number of times refreshing the display can be reduced when a still image is displayed, which can decrease power consumption. The transistor using a metal oxide in the semiconductor layer will be described in detail in Embodiment 4.

The bottom-gate transistor described in this embodiment as an example is preferable because it can reduce the number of manufacturing steps. Here, when amorphous silicon, which can be formed at a lower temperature than polycrystalline silicon, is used, materials with low heat resistance can be used for a wiring, an electrode, or a substrate below the semiconductor layer, resulting in wider choice of materials. For example, an extremely large glass substrate can be suitably used. Meanwhile, the top-gate transistor is preferable because an impurity region is easily formed in a self-aligned manner in the top-gate transistor and variation in characteristics can be reduced. The top-gate transistor is sometimes suitable in the case where polycrystalline silicon, single crystal silicon, or the like is used, in particular.

[Conductive Layer]

As materials that can be used for conductive layers such as a variety of wirings and electrodes that constitute a display device, in addition to a gate, a source, and a drain of a transistor; metals such as aluminum, titanium, chromium, nickel, copper, yttrium, zirconium, molybdenum, silver, tantalum, or tungsten, or an alloy containing any of these metals as its main component can be given. A single-layer structure or a stacked-layer structure including a film containing any of these materials can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which an aluminum film or a copper film is stacked over a titanium film or a titanium nitride film and a titanium film or a titanium nitride film is formed thereover, a three-layer structure in which an aluminum film or a copper film is stacked over a molybdenum film or a molybdenum nitride film and a molybdenum film or a molybdenum nitride film is formed thereover, and the like can be given. Note that an oxide such as indium oxide, tin oxide, or zinc oxide may be used. Copper containing manganese is preferably used because it increases controllability of the shape by etching.

Moreover, as a light-transmitting conductive material that can be used for conductive layers such as a variety of wirings and electrodes that constitute a display device, in addition to a gate, a source, and a drain of a transistor; a conductive oxide such as indium oxide, indium tin oxide, indium zinc oxide, zinc oxide, or zinc oxide to which gallium is added or graphene can be used. A metal material such as gold, silver, platinum, magnesium, nickel, tungsten, chromium, molybdenum, iron, cobalt, copper, palladium, or titanium, or an alloy material containing the metal material can also be used. A nitride of the metal material (e.g., titanium nitride) or the like may also be used. Note that in the case where the metal material or the alloy material (or the nitride thereof) is used, the material is made thin enough to have a light-transmitting property. In addition, a stacked film of any of the above materials can be used for the conductive layers. For example, when a stacked film of indium tin oxide and an alloy of silver and magnesium, or the like is used, the conductivity can be increased, which is preferable. They can also be used for conductive layers such as a variety of wirings and electrodes that constitute a display device, and conductive layers (conductive layers functioning as a pixel electrode or a common electrode) included in a display element.

[Insulating Layer]

As an insulating material that can be used for the insulating layers, an inorganic insulating material such as silicon oxide, silicon oxynitride, silicon nitride oxide, silicon nitride, or aluminum oxide, in addition to a resin such as acrylic or epoxy and a resin having a siloxane bond can be used, for example.

As an insulating film with low water permeability, a film containing nitrogen and silicon, such as a silicon nitride film and a silicon nitride oxide film, and a film containing nitrogen and aluminum, such as an aluminum nitride film, or the like can be given. A silicon oxide film, a silicon oxynitride film, an aluminum oxide film, or the like may also be used.

[Liquid Crystal Element]

As the liquid crystal element, for example, a liquid crystal element employing a vertical alignment (VA) mode can be used. As the vertical alignment mode, an MVA (Multi-Domain Vertical Alignment) mode, a PVA (Patterned Vertical Alignment) mode, and an ASV (Advanced Super View) mode, or the like can be used.

As the liquid crystal element, a liquid crystal element employing any of a variety of modes can be used. For example, it is possible to use a liquid crystal element employing a TN (Twisted Nematic) mode, an IPS (In-Plane-Switching) mode, an FFS (Fringe Field Switching) mode, an ASM (Axially Symmetric aligned Micro-cell) mode, an OCB (Optically Compensated Birefringence) mode, an FLC (Ferroelectric Liquid Crystal) mode, an AFLC (AntiFerroelectric Liquid Crystal) mode, an ECB (Electrically Controlled Birefringence) mode, a guest-host mode, or the like instead of a VA mode.

Note that the liquid crystal element is an element that controls the transmission or non-transmission of light utilizing an optical modulation action of a liquid crystal. Note that the optical modulation action of the liquid crystal is controlled by an electric field applied to the liquid crystal (including a horizontal electric field, a vertical electric field, or an oblique electric field). As the liquid crystal used for the liquid crystal element, a thermotropic liquid crystal, a low-molecular liquid crystal, a high-molecular liquid crystal, a polymer dispersed liquid crystal (PDLC), a polymer network liquid crystal (PNLC), a ferroelectric liquid crystal, an anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either a positive liquid crystal or a negative liquid crystal may be used, and an optimal liquid crystal material may be used depending on the mode or design to be used.

An alignment film can be provided to control the alignment of a liquid crystal. In the case where a horizontal electric field mode is employed, a liquid crystal exhibiting a blue phase for which an alignment film is not used may be used. The blue phase is one of the liquid crystal phases, which appears just before a cholesteric phase changes into an isotropic phase when the temperature of a cholesteric liquid crystal is increased. Since the blue phase appears only in a narrow temperature range, a liquid crystal composition in which a chiral material is mixed to account for several weight percent or more is used for the liquid crystal layer in order to improve the temperature range. The liquid crystal composition containing a liquid crystal exhibiting a blue phase and a chiral material has a short response time and optical isotropy. In addition, the liquid crystal composition containing a liquid crystal exhibiting a blue phase and a chiral material does not need alignment treatment and has small viewing angle dependence. Since the alignment film does not need to be provided, rubbing treatment is not necessary; accordingly, electrostatic discharge damage caused by the rubbing treatment can be prevented, reducing defects and damage of a liquid crystal display device in the manufacturing process.

As the liquid crystal element, a transmissive liquid crystal element, a reflective liquid crystal element, a semi-transmissive liquid crystal element, or the like can be given.

In one embodiment of the present invention, in particular, a transmissive liquid crystal element can be suitably used.

In the case where a transmissive or semi-transmissive liquid crystal element is used, two polarizing plates are provided such that a pair of substrates are sandwiched therebetween. Furthermore, a backlight is provided on the outer side of the polarizing plate. The backlight may be a direct-below backlight or may be an edge-light backlight. The use of a direct-below backlight with LEDs is preferable because it makes local dimming easier and can increase the contrast. The use of an edge-light backlight is preferable because it can decrease the thickness of a module including the backlight.

Note that when an edge-light backlight is off, see-through display can be performed.

[Coloring Layer]

As a material that can be used for the coloring layer, a metal material, a resin material, and a resin material containing a pigment or dye can be given.

[Light-Blocking Layer]

As a material that can be used for the light-blocking layer, carbon black, titanium black, a metal, a metal oxide, and a composite oxide containing a solid solution of a plurality of metal oxides can be given. The light-blocking layer may be a film containing a resin material or a thin film of an inorganic material such as a metal. A stacked-layer film containing the material of the coloring layer can also be used for the light-blocking layer. For example, a stacked-layer structure of a film containing a material of a coloring layer which transmits light of a certain color and a film containing a material of a coloring layer which transmits light of another color can be employed. The use of the same material for the coloring layer and the light-blocking layer is preferable, in which case the same manufacturing apparatus can be used and the process can be simplified.

The above is the description of each of the components.

At least part of this embodiment can be implemented in combination with any of the other embodiments described in this specification as appropriate.

Embodiment 3

In this embodiment, examples of a method of crystallization for polycrystalline silicon which can be used for a semiconductor layer of a transistor and a laser crystallization apparatus are described.

To form a polycrystalline silicon layer having favorable crystallinity, it is preferable that an amorphous silicon layer be provided over a substrate and the amorphous silicon layer be crystallized by laser irradiation. For example, a linear beam is used as laser light and the substrate is moved while the amorphous silicon layer is irradiated with the linear beam, so that a polycrystalline silicon layer can be formed in a desired region over the substrate.

The method using a linear beam is relatively favorable in throughput. On the other hand, it is a method in which laser light is moved relative to a region and is emitted a plurality of times; thus, variation in crystallinity tends to be produced owing to a change in the output of laser light and a change in the beam profile caused by the output change. For example, when a semiconductor layer crystallized by this method is used for transistors included in pixels of a display device, a random stripe pattern caused by crystallinity variations might be observed in the display.

The length of the linear beam is ideally greater than or equal to the length of a side of the substrate; however, the length of the linear beam is limited by an output of a laser and the structure of an optical system. Thus, it is practical to irradiate a large substrate with the laser light by turning back the laser light in a substrate plane. Consequently, there is a region irradiated with the laser light a plurality of times. Since the crystallinity of such a region is likely to be different from that of the other region, display unevenness is sometimes caused in the region.

To avoid such a problem as mentioned above, an amorphous silicon layer formed over a substrate may be crystallized by local laser irradiation. Local laser irradiation easily forms a polycrystalline silicon layer with small variation in crystallinity.

Figure 14A:
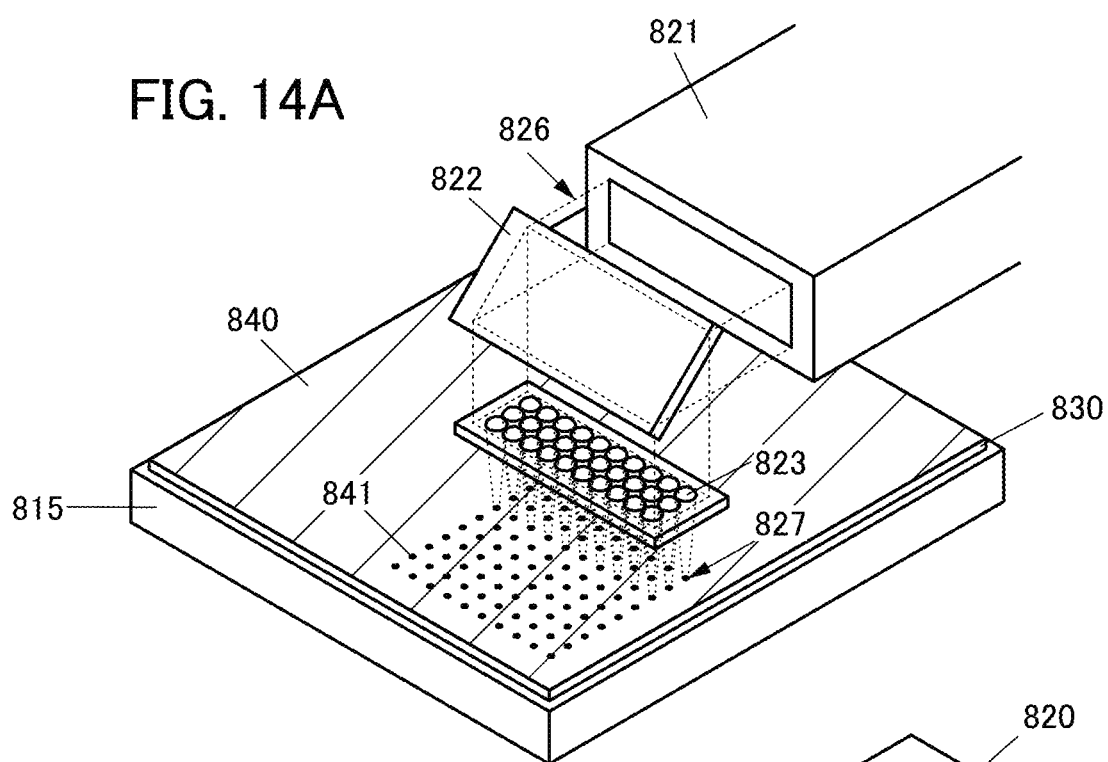
FIG. 14 Diagrams illustrating a laser irradiation method and a laser crystallization apparatus.

FIG. 14(A) is a diagram illustrating a method of performing local laser irradiation on an amorphous silicon layer formed over a substrate.

Laser light 826 emitted from an optical system unit 821 is reflected by a mirror 822 and enters a microlens array 823. The microlens array 823 collects the laser light 826 to form a plurality of laser beams 827.

A substrate 830 over which an amorphous silicon layer 840 is formed is fixed to a stage 815. The amorphous silicon layer 840 is irradiated with the plurality of laser beams 827, so that a plurality of polycrystalline silicon layers 841 can be formed at the same time.

Microlenses of the microlens array 823 are preferably provided to match with a pixel pitch of the display device. Alternatively, they may be provided at intervals of an integral multiple of the pixel pitch. In either of the cases, polycrystalline silicon layers can be formed in regions corresponding to all pixels by repeating the laser irradiation and the movement of the stage 815 in the X direction or the Y direction.

For example, when the microlens array 823 includes M rows and N columns (M and N are natural numbers) of microlenses arranged with a pixel pitch, laser irradiation is performed at a predetermined start position first, so that M rows and N columns of polycrystalline silicon layers 841 can be formed. Then, the stage 815 is moved by M rows in the row direction, laser irradiation is performed, and M rows and N columns of polycrystalline silicon layers 841 are further formed; consequently, M rows and 2N columns of polycrystalline silicon layers 841 can be formed. By repeating the steps, a plurality of polycrystalline silicon layers 841 can be formed in desired regions. In the case where laser irradiation is performed by turning back the laser light, laser irradiation is performed after movement in the X direction by a distance of N columns, and laser irradiation is repeated after movement in the Y direction by a distance of M rows.

Note that even in the case of a method in which laser irradiation is performed while the stage 815 is moved in one direction, polycrystalline silicon layers can be formed with a pixel pitch by adjusting the oscillation frequency of the laser light and the moving speed of the stage 815 properly.

The size of the laser beam 827 can be approximately an area in which the whole semiconductor layer of a transistor is included, for example. Alternatively, it can be an area including the entire channel region of one transistor. Alternatively, it can be an area including part of a channel region of one transistor. The size can be selected from them depending on required electrical characteristics of a transistor.

Note that in the case where the target is a display device including a plurality of transistors in one pixel, the laser beam 827 can have an area including the entire semiconductor layer of each transistor in one pixel. Alternatively, the laser beam 827 may have an area including the entire semiconductor layers of transistors included in a plurality of pixels.

Figure 15A:
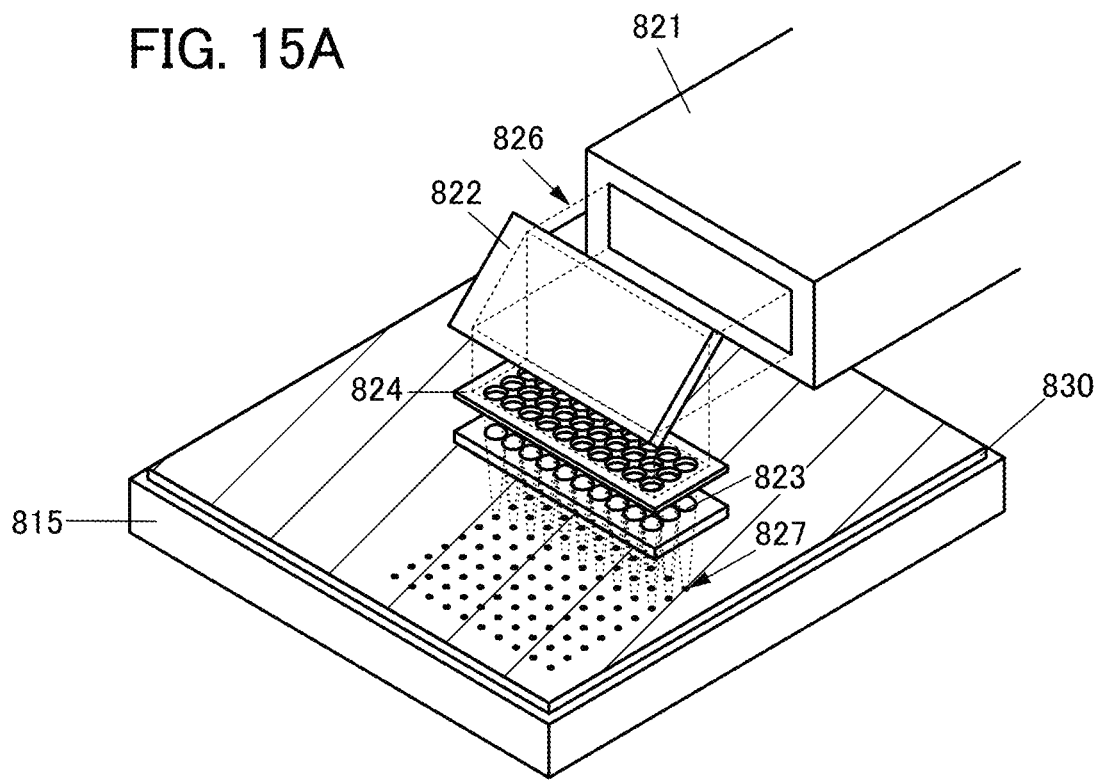
FIG. 15 Diagrams each illustrating a laser irradiation method.
Figure 15B:
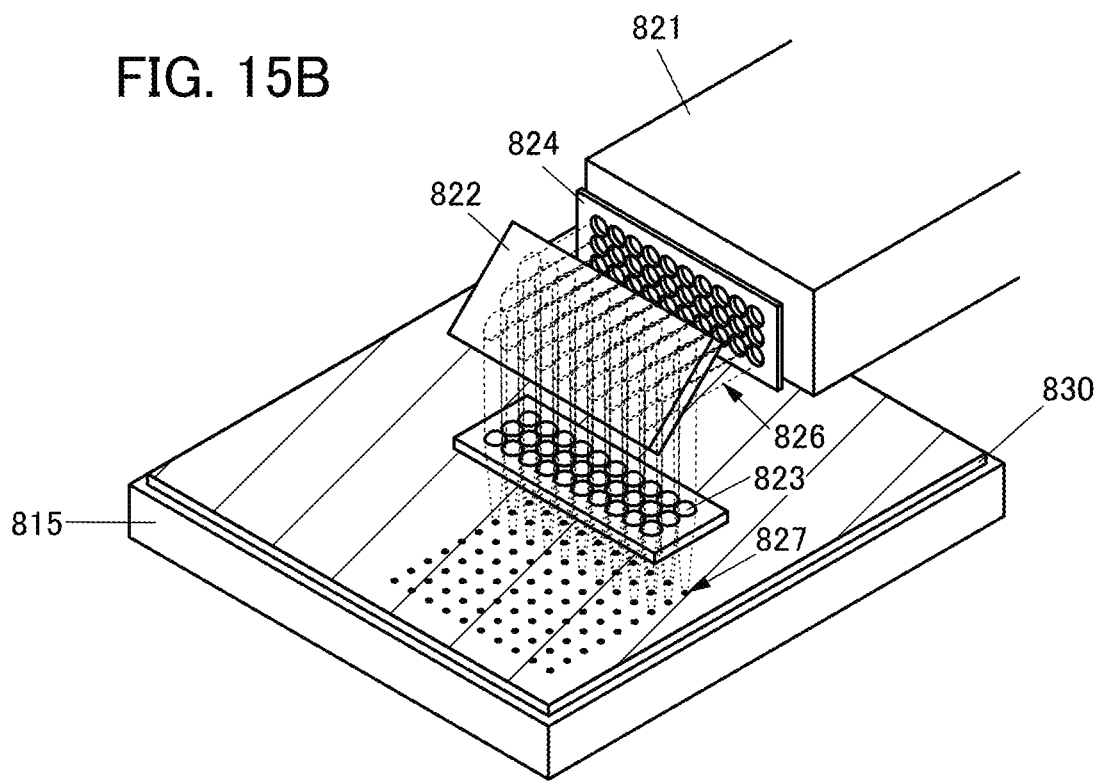

As illustrated in FIG. 15(A), a mask 824 may be provided between the mirror 822 and the microlens array 823. The mask 824 is provided with a plurality of openings corresponding to respective microlenses. The shape of the opening can be projected in the shape of the laser beam 827; as illustrated in FIG. 15(A), the laser beam 827 having a circular shape can be obtained in the case where the mask 824 includes circular openings. The laser beam 827 having a rectangular shape can be obtained in the case where the mask 824 includes rectangular openings. The mask 824 is effective in the case where only a channel region of a transistor is crystallized, for example. Note that the mask 824 may be provided between the optical system unit 821 and the mirror 822 as illustrated in FIG. 15(B).

Figure 14B:
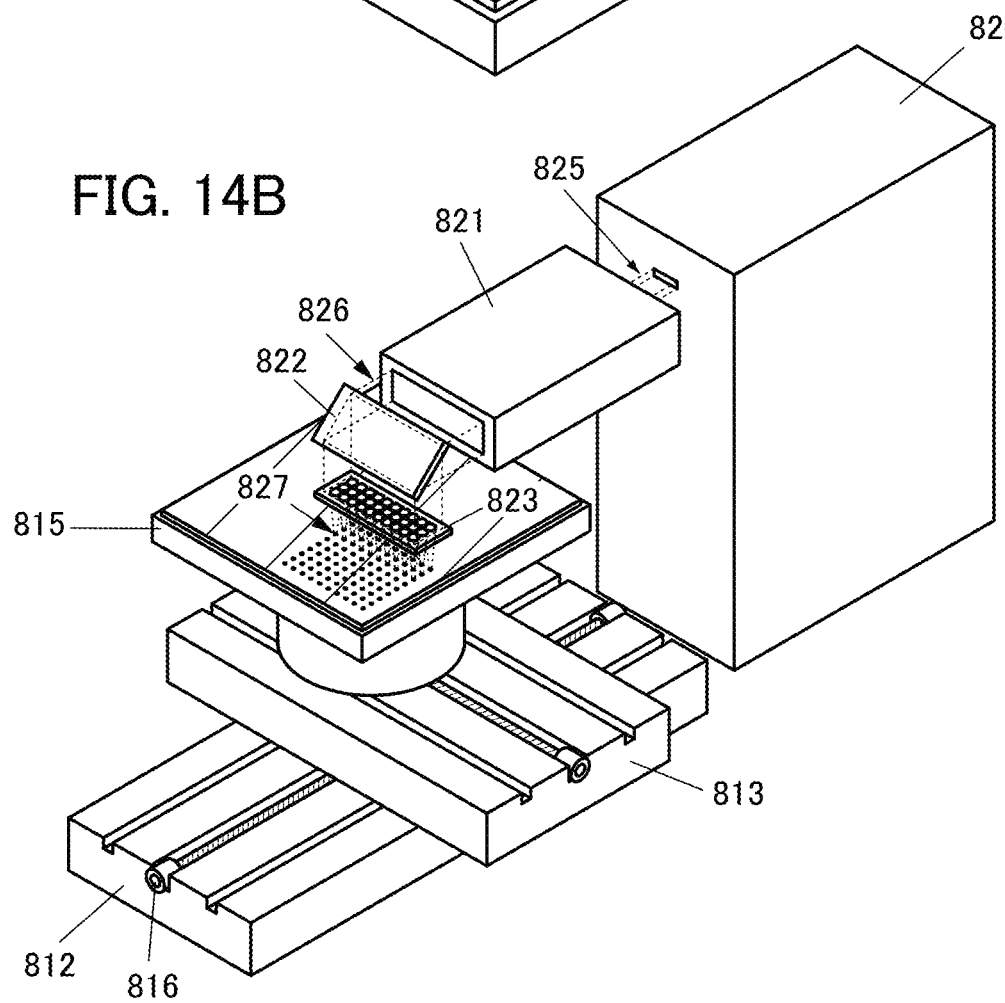

FIG. 14(B) is a perspective view illustrating a main structure of a laser crystallization apparatus that can be used in the local laser irradiation step shown above. The laser crystallization apparatus includes a moving mechanism 812, a moving mechanism 813, and the stage 815 which are components of an X-Y stage. A laser 820, the optical system unit 821, the mirror 822, and the microlens array 823 to shape the laser beam 827 are further included.

The moving mechanism 812 and the moving mechanism 813 each have a function of performing reciprocating linear motion in the horizontal direction. As a mechanism for powering the moving mechanism 812 and the moving mechanism 813, a ball screw mechanism 816 driven by a motor can be used, for example. The moving directions of the moving mechanism 812 and the moving mechanism 813 cross orthogonally; thus, the stage 815 fixed to the moving mechanism 813 can be moved in the X direction and in the Y direction freely.

The stage 815 includes a fixing mechanism such as a vacuum suction mechanism and can fix the substrate 830 or the like. Furthermore, the stage 815 may include a heating mechanism as needed. Although not illustrated, the stage 815 includes a pusher pin and a vertical moving mechanism thereof, and the substrate 830 or the like can be moved up and down when the substrate 830 or the like is transferred.

The laser 820 is preferably a pulsed laser, but may be a CW laser as long as light with a wavelength and intensity suitable for the purpose of processing can be output. Typically, an excimer laser capable of emitting ultraviolet light with a wavelength of 351-353 nm (XeF), 308 nm (XeCl), or the like can be used. Alternatively, a second harmonic wavelength (515 nm, 532 nm, or the like) or a third harmonic wavelength (343 nm, 355 nm, or the like) of a solid-state laser (a YAG laser, a fiber laser, or the like) may be used. A plurality of lasers 820 may be provided.

The optical system unit 821 includes a mirror, a beam expander, a beam homogenizer, and the like, for example, and can expand laser light 825 while homogenizing the energy in-plane distribution of the laser light 825 output from the laser 820.

As the mirror 822, a dielectric multilayer mirror can be used, for example, and is provided so that the incident angle of the laser light is substantially 45°. The microlens array 823 can have a shape such that a plurality of convex lenses are provided on the top surface or on the top and bottom surfaces of a quartz board, for example.

With the use of the above-described laser crystallization apparatus, polycrystalline silicon layers with small variation in crystallinity can be formed.

At least part of this embodiment can be implemented in combination with any of the other embodiments described in this specification as appropriate.

Embodiment 4

In this specification and the like, a metal oxide is an oxide of metal in a broad sense. Metal oxides are classified into an oxide insulator, an oxide conductor (including a transparent oxide conductor), an oxide semiconductor (or also simply referred to as an OS), and the like. For example, a metal oxide used in a semiconductor layer of a transistor is referred to as an oxide semiconductor in some cases. That is to say, in the case where a metal oxide has at least one of an amplifying function, a rectifying function, and a switching function, the metal oxide can be called a metal oxide semiconductor, or OS for short. An OS FET can be rephrased as a transistor including a metal oxide or an oxide semiconductor.

In this specification and the like, metal oxides containing nitrogen are also collectively referred to as a metal oxide in some cases. A metal oxide containing nitrogen may be referred to as a metal oxynitride.

Furthermore, in this specification and the like, CAAC (c-axis aligned crystal) and CAC (Cloud-Aligned Composite) may be stated in some cases. Note that CAAC refers to an example of a crystal structure, and CAC refers to an example of a function or a material composition.

Furthermore, in this specification and the like, a CAC-OS or a CAC-metal oxide has a conducting function in part of the material and has an insulating function in another part of the material, and has a function of a semiconductor as a whole. Note that, in the case where the CAC-OS or the CAC-metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, a switching function (On/Off function) can be given to the CAC-OS or the CAC-metal oxide. In the CAC-OS or the CAC-metal oxide, separation of the functions can maximize each function.

Furthermore, the CAC-OS or the CAC-metal oxide includes components having different bandgaps. For example, the CAC-OS or the CAC-metal oxide includes a component having a wide gap due to the insulating region and a component having a narrow gap due to the conductive region. In the case of such a structure, when carriers flow, carriers mainly flow in the component having a narrow gap. Furthermore, the component having a narrow gap complements the component having a wide gap, and carriers also flow in the component having a wide gap in conjunction with the component having a narrow gap. Therefore, in the case where the above-described CAC-OS or the CAC-metal oxide is used in a channel region of a transistor, high current drive capability in the on state of the transistor, that is, a high on-state current and high field-effect mobility, can be obtained.

In other words, the CAC-OS or the CAC-metal oxide can also be referred to as a matrix composite or a metal matrix composite.

<Composition of CAC-OS>

The composition of a CAC-OS that can be used in a transistor disclosed in one embodiment of the present invention is described below.

The CAC-OS is, for example, a composition in which elements included in an oxide semiconductor are unevenly distributed to have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions containing the metal element(s) are mixed to have a size of greater than or equal to 0.5 nm and less than or equal to 10 nm, preferably greater than or equal to 1 nm and less than or equal to 2 nm, or a similar size is referred to as a mosaic pattern or a patch-like pattern.

Note that an oxide semiconductor preferably contains at least indium. In particular, indium and zinc are preferably contained. In addition to them, one or more kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For instance, a CAC-OS in an In—Ga—Zn oxide (an In—Ga—Zn oxide in the CAC-OS may be particularly referred to as CAC-IGZO) has a composition in which materials are separated into indium oxide (hereinafter $InO_{X1}$ (X1 is a real number greater than 0)) or indium zinc oxide (hereinafter $In_{X2}Zn_{Y2}O_{Z2}$ (X2, Y2, and Z2 are real numbers greater than 0)) and gallium oxide (hereinafter $GaO_{X3}$ (X3 is a real number greater than 0)) or gallium zinc oxide (hereinafter $Ga_{X4}Zn_{Y4}O_{Z4}$ (X4, Y4, and Z4 are real numbers greater than 0)), for example, so that a mosaic pattern is formed, and mosaic-like $InO_{X1}$ or $In_{X2}Zn_{Y2}O_{Z2}$ is evenly distributed in the film (which is hereinafter also referred to as cloud-like).

That is, the CAC-OS is a composite oxide semiconductor having a composition in which a region containing $GaO_{X3}$ as a main component and a region containing $In_{X2}Zn_{Y2}O_{Z2}$ or $InO_{X1}$ as a main component are mixed. Note that in this specification, when the atomic ratio of In to an element M in a first region is larger than the atomic ratio of In to the element M in a second region, the first region is regarded as having a higher In concentration than the second region, for example.

Note that IGZO is a commonly known name and sometimes refers to one compound formed of In, Ga, Zn, and O. A typical example is a crystalline compound represented by $InGaO_3(ZnO)_{m1}$ (m1 is a natural number) or $In_{(1+x0)}Ga_{(1-x0)}O_3(ZnO)_{m0}$ ($-1 \leq x0 \leq 1$; m0 is a given number).

The above crystalline compound has a single crystal structure, a polycrystalline structure, or a CAAC structure. Note that the CAAC structure is a crystal structure in which a plurality of IGZO nanocrystals have c-axis alignment and are connected in the a-b plane without alignment.

Meanwhile, the CAC-OS relates to the material composition of an oxide semiconductor. The CAC-OS refers to a composition in which, in the material composition containing In, Ga, Zn, and O, some regions that contain Ga as a main component and are observed as nanoparticles and some regions that contain In as a main component and are observed as nanoparticles are randomly dispersed in a mosaic pattern. Therefore, the crystal structure is a secondary element for the CAC-OS.

Note that the CAC-OS is regarded as not including a stacked-layer structure of two or more kinds of films with different compositions. For example, a two-layer structure of a film containing In as a main component and a film containing Ga as a main component is not included.

Note that a clear boundary cannot sometimes be observed between the region containing $GaO_{X3}$ as a main component and the region containing $In_{X2}Zn_{Y2}O_{Z2}$ or $InO_{X1}$ as a main component.

Note that in the case where one kind or a plurality of kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, the CAC-OS refers to a composition in which some regions that contain the metal element(s) as a main component and are observed as nanoparticles and some regions that contain In as a main component and are observed as nanoparticles are randomly dispersed in a mosaic pattern.

The CAC-OS can be formed by a sputtering method under conditions where a substrate is not heated, for example. Moreover, in the case of forming the CAC-OS by a sputtering method, any one or more selected from an inert gas (typically, argon), an oxygen gas, and a nitrogen gas are used as a deposition gas. Furthermore, the ratio of the flow rate of an oxygen gas to the total flow rate of the deposition gas at the time of deposition is preferably as low as possible, and for example, the ratio of the flow rate of the oxygen gas is preferably higher than or equal to 0% and lower than 30%, further preferably higher than or equal to 0% and lower than or equal to 10%.

The CAC-OS is characterized in that no clear peak is observed in measurement using θ/2θ scan by an Out-of-plane method, which is one of X-ray diffraction (XRD) measurement methods. That is, it is found from the X-ray diffraction that no alignment in the a-b plane direction and the c-axis direction is observed in a measured region.

In addition, in an electron diffraction pattern of the CAC-OS which is obtained by irradiation with an electron beam with a probe diameter of 1 nm (also referred to as a nanobeam electron beam), a ring-like high-luminance region and a plurality of bright spots in the ring region are observed. It is therefore found from the electron diffraction pattern that the crystal structure of the CAC-OS includes an nc (nanocrystal) structure with no alignment in the plan-view direction and the cross-sectional direction.

Moreover, for example, it can be confirmed by EDX mapping obtained using energy dispersive X-ray spectroscopy (EDX) that the CAC-OS in the In—Ga—Zn oxide has a composition in which regions containing $GaO_{X3}$ as a main component and regions containing $In_{X2}Zn_{Y2}O_{Z2}$ or $InO_{X1}$ as a main component are unevenly distributed and mixed.

The CAC-OS has a composition different from that of an IGZO compound in which the metal elements are evenly distributed, and has characteristics different from those of the IGZO compound. That is, the CAC-OS has a composition in which regions containing $GaO_{X3}$ or the like as a main component and regions containing $In_{X2}Zn_{Y2}O_{Z2}$ or $InO_{X1}$ as a main component are phase-separated from each other and form a mosaic pattern.

Here, a region containing $In_{X2}Zn_{Y2}O_{Z2}$ or $InO_{X1}$ as a main component is a region whose conductivity is higher than that of a region containing $GaO_{X3}$ or the like as a main component. In other words, when carriers flow through the regions containing $In_{X2}Zn_{Y2}O_{Z2}$ or $InO_{X1}$ as a main component, the conductivity of an oxide semiconductor is exhibited. Accordingly, when the regions containing $In_{X2}Zn_{Y2}O_{Z2}$ or $InO_{X1}$ as a main component are distributed like a cloud in an oxide semiconductor, high field-effect mobility (μ) can be achieved.

In contrast, a region containing $GaO_{X3}$ or the like as a main component is a region whose insulating property is higher than that of a region containing $In_{X2}Zn_{Y2}O_{Z2}$ or $InO_{X1}$ as a main component. In other words, when regions containing $GaO_{X3}$ or the like as a main component are distributed in an oxide semiconductor, leakage current can be suppressed and favorable switching operation can be achieved.

Accordingly, when the CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current (Ion) and high field-effect mobility (ip) can be achieved.

Moreover, a semiconductor element using the CAC-OS has high reliability. Thus, the CAC-OS is most suitable for a variety of semiconductor devices such as displays.

At least part of this embodiment can be implemented in combination with any of the other embodiments described in this specification as appropriate.

Embodiment 5

In this embodiment, electronic devices of one embodiment of the present invention will be described with reference to drawings.

Electronic devices described as examples below each include an optical touch panel utilizing the optical module of one embodiment of the present invention. Thus, they are electronic devices in which a touch panel suitable for the size increase of display devices is incorporated. In addition, they can be electronic devices capable of reducing power consumption, because the light source for the optical touch panel and the display device can be provided by the optical module 120 described in Embodiment 1. Furthermore, the display device of the electronic device of one embodiment of the present invention is easily adapted to the increase in size of the display device because it includes an optical touch panel; it is preferable that an image with a resolution of full high vision, 4K2K, 8K4K, 16K8K, or higher be displayed on the display device. The optical touch sensor includes openings that are paired in the longitudinal direction, the lateral direction, or the oblique direction in the top view. The following electronic devices may be described with reference to drawings with only openings in either the longitudinal direction or the latitude direction, or an opening on the emission side in the lateral direction, for the purpose of simplifying the description.

As the electronic devices, a table-type display device, digital signage, a transparent display device, a desktop or laptop personal computer, a portable information terminal (a tablet, a smartphone), a digital video camera (a digital camera), a refrigerator, a clock, and the like can be given, for example.

The electronic device of one embodiment of the present invention can be incorporated in the inside wall or outside wall of a house or building or the interior or exterior of a car along their curved surfaces.

The electronic device of one embodiment of the present invention may include an antenna. When a signal is received by an antenna, the electronic device can display images, data, or the like on the display portion. When the electronic device includes an antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radioactive rays, flow rate, humidity, gradient, oscillation, smell, or infrared rays).

The electronic device of one embodiment of the present invention can have a variety of functions. For example, the electronic device can have a function of displaying a variety of data (a still image, a moving image, a text image, and the like) on the display portion, a function of displaying a calendar, date, time, or the like, a function of executing a variety of software (programs), a wireless communication function, and a function of reading out a program or data stored in a recording medium.

Figure 16A:
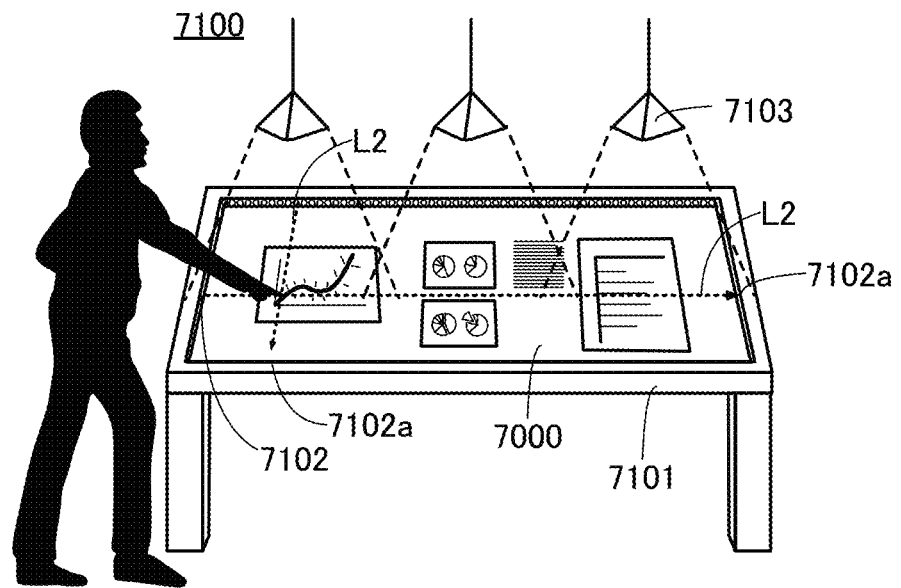
FIG. 16 Diagrams each illustrating an electronic device.

An electronic device 7100 illustrated in FIG. 16(A) includes a table-type housing 7101, a display device 7000, and the optical module 120 (not illustrated in the drawing). The table-type housing 7101 includes an opening 7102 and an opening 7102a. The display device 7000 is preferably either a semi-transmissive liquid crystal display device or a reflective liquid crystal display device.

The optical module 120 included in the electronic device 7100 can emit light L2 with a wavelength range longer than 680 nm through the opening 7102 provided in the housing 7101. The light L2 enters the opening 7102a, and touch detection can be performed by the light-receiving element 115 included in the optical module 120. FIG. 16(A) illustrates an example in which, as a graph displayed on the display device 7000 is touched, legends of the selected graph flash. As a display example of different applications, a game or the like may be carried out. More than one person can enjoy the game or the like at the same time.

An example in which the display device 7000 has the structure of a semi-transmissive liquid crystal display device is described. In the display device 7000, light emitted from a lighting device 7103 and light supplied by the optical module 120 can be used as the light source. Even when the luminance of light emitted from the lighting device 7103 is insufficient, the luminance of the display device 7000 can be compensated with light supplied from the optical module 120.

Next, an example in which the display device 7000 has the structure of a reflective liquid crystal display device is described. In the display device 7000, light emitted from the lighting device 7103 and light supplied by the optical module 120 can be added and used as the light source to perform display. Even when the luminance of the lighting device 7103 is insufficient, the luminance of the display device 7000 can be compensated with light supplied from the optical module 120.

Furthermore, the electronic device 7100 can perform display with the use of the light source provided by the optical module 120 even when the lighting device 7103 is off, regardless of the structure of the display device 7000.

Figure 16B:
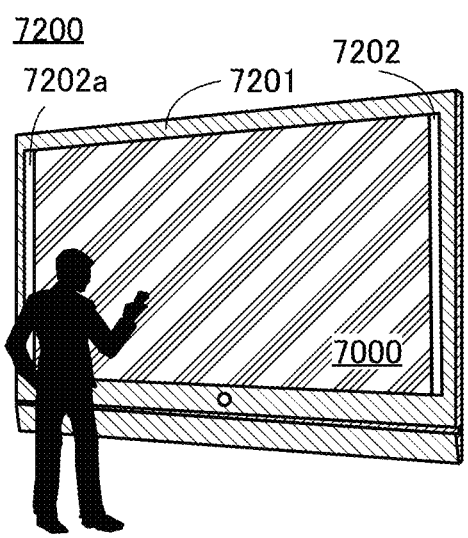

An electronic device 7200 illustrated in FIG. 16(B) includes a housing 7201, a display device 7000, and an optical module 120. The electronic device 7200 is digital signage provided with the display device 7000. The housing 7201 includes an opening 7202 and an opening 7202a. The digital signage has the function of displaying information, inputting data, accessing to a data server, or an electronic blackboard.

Digital signage is often used outside, and is often used in the environment where the intensity of external light greatly changes. Thus, a reflective liquid crystal display device is preferably used when sunlight enters. However, when external light is not sufficient like in the evening or at night, it is preferable to perform display using the light source provided by an optical module. The electronic device 7200 can provide a touch detection function by detecting light that is emitted through the opening 7202 provided in the housing 7201 and enters the opening 7202a. That is, the display device 7000 can perform touch detection while it performs display.

Figure 16C:
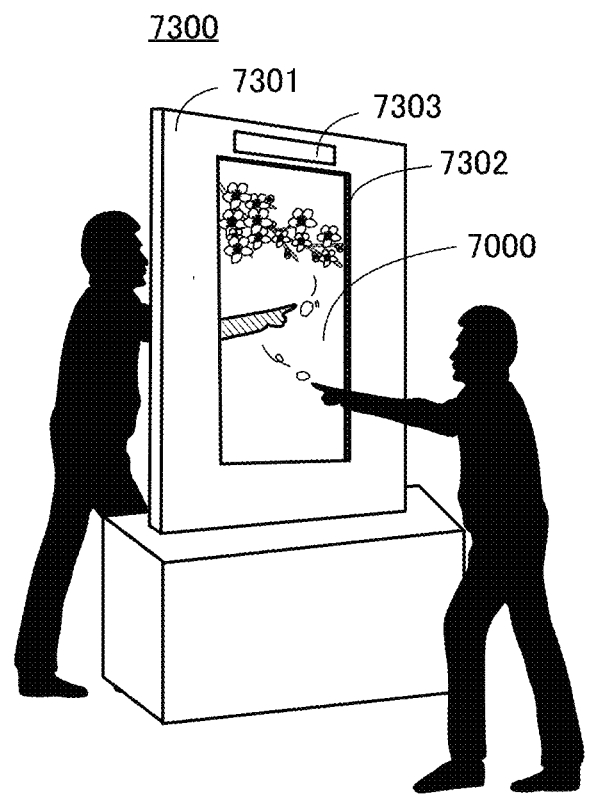

An electronic device 7300 illustrated in FIG. 16(C) includes a housing 7301, a display device 7000, a light 7303, and an optical module 125. The housing 7301 includes an opening 7302 and an opening 7302a (not shown in the drawing). The electronic device 7300 can be incorporated in the inner wall or outer wall of a house or building, a divider of a space (e.g., a door, a window, a wall, and a partition of a room or desk), and the like. Furthermore, the display device 7000 can be provided as a transparent display device 7000 whose backside is visible, by being provided with a region where light can pass through in a pixel formed in the TFT layer. In addition, the electronic device 7300 can provide a function of detecting touch by detecting light that is emitted through the opening 7302 provided in the housing 7301 and enters the opening 7302a.

FIG. 16(C) illustrates a scene where the display screen with falling cherry blossom petals is touched by a user on each side. The display device 7000 can detect the information of being touched from different display surfaces. The light 7303 can function as a lighting apparatus by being always on. Alternatively, the light 7303 may be provided with responsiveness with which it is turned on when touched. It is also possible to make the digital signage carry out a game. Then, many and unspecified users can join in and enjoy the game at the same time.

Figure 17A:
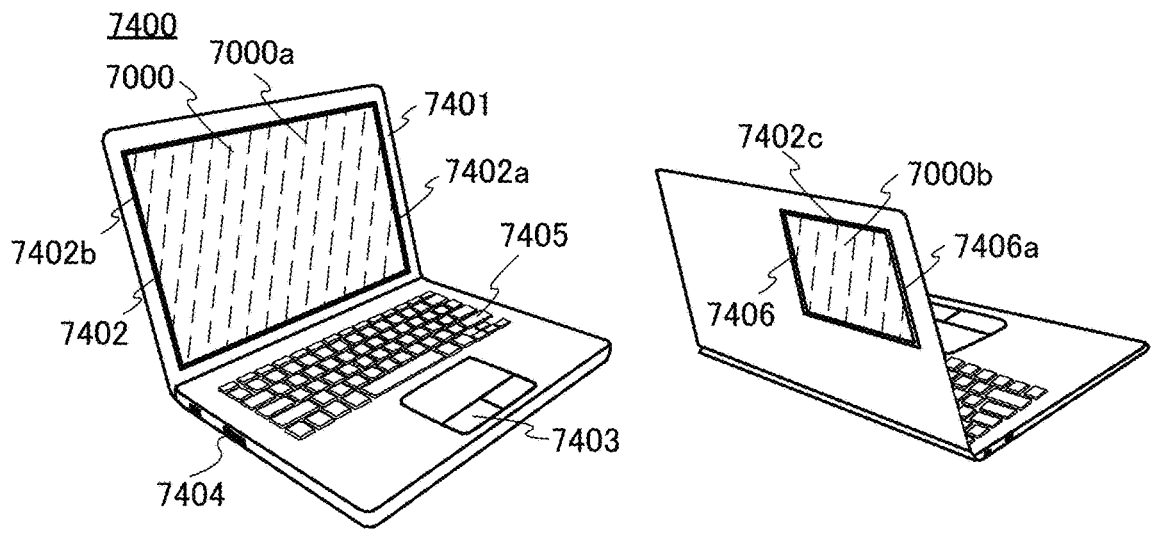
FIG. 17 Diagrams each illustrating an electronic device.

FIG. 17(A) illustrates a laptop personal computer 7400. The laptop personal computer 7400 includes a display device 7000, a housing 7401, a pointing device 7403, an external connection port 7404, a keyboard 7405, and the like. The display device 7000 in FIG. 17(A) is an example in which the display device 132 illustrated in FIG. 7 is used.

The housing 7401 includes an opening 7402, an opening 7402a, an opening 7402b, and an opening 7402c. The display device 7000 is incorporated in the housing 7401. The display device 7000 includes a display surface 7000a and a display surface 7000b. Although an example in which the laptop personal computer 7400 includes the display surface 7000a and the display surface 7000b which are different in size is illustrated, their size may be the same.

The display surface 7000a is placed to overlap with the opening 7402b, and the display surface 7000b is placed to overlap with the opening 7402c. The opening 7402 and the opening 7402a are provided on the display surface 7000a side and the display surface 7000b side, respectively.

Figure 17B:
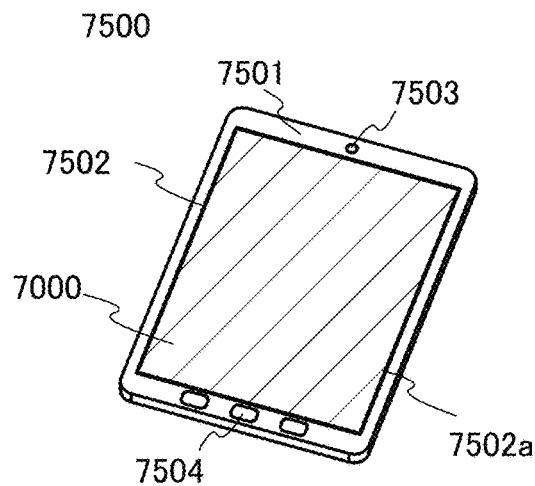

FIG. 17(B) illustrates a tablet 7500 as an example of portable information terminals. The tablet 7500 includes a display device 7000, a housing 7501, an image sensor 7503, a plurality of switches 7504, and the like. The housing 7501 includes an opening 7502 and an opening portion 7502a for an optical touch sensor. The display device 7000 is incorporated in the housing 7501.

Figure 17C:
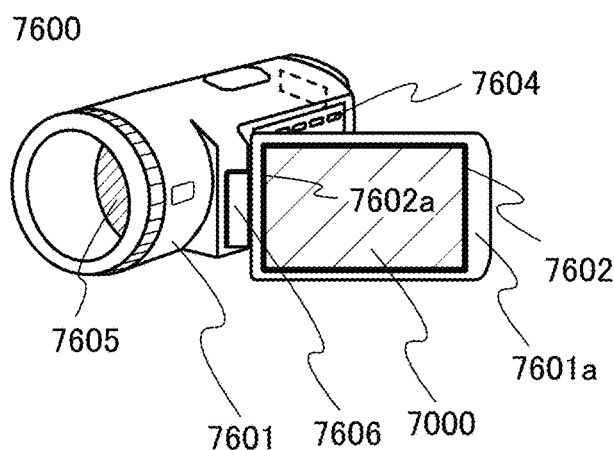

FIG. 17(C) illustrates a digital video camera 7600 as an example of digital cameras. The digital video camera 7600 includes a display device 7000, a housing 7601, a housing 7601a, an operation switch 7604, an image sensor 7605, a movable portion switch 7606, and the like. The housing 7601a includes an opening 7602 and an opening 7602a for an optical touch sensor. The display device 7000 is incorporated in the housing 7601a.

Figure 17D:
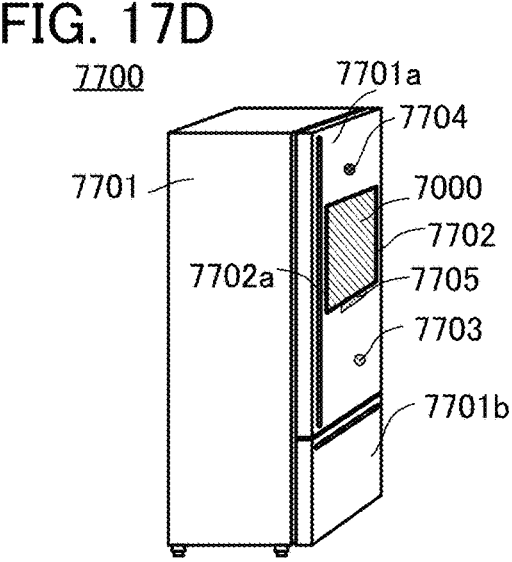

FIG. 17(D) illustrates a refrigerator 7700 as an example of kitchen electric appliances. The refrigerator 7700 includes a housing 7701, a door 7701*a*, a door 7701*b*, a microphone 7703, an image sensor 7704, a speaker 7705, and the like. In addition, the door 7701*a* includes an opening 7702 and an opening portion 7702*a* for an optical touch sensor. A display device 7000 is incorporated in the door 7701*a*.

Figure 17E:
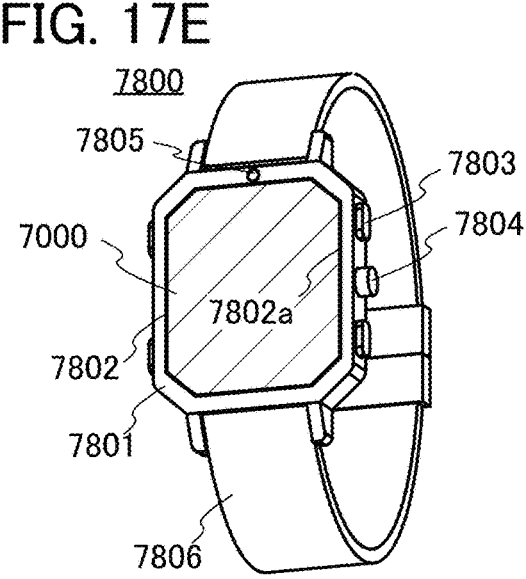

FIG. 17(E) illustrates a smartwatch 7800) as an example of portable information terminals. The smartwatch 7800 includes a display device 7000, a housing 7801, a switch 7803, a crown 7804, an image sensor 7805, a belt 7806, and the like. The housing 7801 includes an opening 7802 and an opening 7802*a* for an optical touch sensor. The display device 700) is incorporated in the housing 7801. Furthermore, the housing 7801 preferably includes a substantially octagon-shaped opening, and also openings through which light L2 is emitted and enter and which are paired in the oblique direction. The belt 7806 need not necessarily be included. The belt 7806 may be replaced by a chain, a string, or the like.

At least part of this embodiment can be implemented in combination with any of the other embodiments described in this specification as appropriate.

DESCRIPTION OF NUMERALS

GL1: wiring, GL2: wiring, GL3: wiring, M1: mirror, M2: mirror, M3: mirror, M4: mirror, M5: mirror, M6: mirror, S1: wiring, S2: wiring, S3: wiring, 11: substrate, 12: substrate. 17: optical layer, 20: liquid crystal element, 21: conductive layer, 22: liquid crystal. 23: conductive layer, 24*a*: alignment film, 24*b*: alignment film. 26: insulating layer, 30: transistor, 31: conductive layer, 31*a*: conductive layer, 32: semiconductor layer, 32*p*: semiconductor layer, 33*a*: conductive layer, 33*b*: conductive layer, 33*c*: conductive layer, 33*d*: conductive layer, 34: insulating layer, 35: impurity semiconductor layer, 37: semiconductor layer, 38: connection portion, 39*a*: polarizing plate, 39*b*: polarizing plate, 41: coloring layer, 42: light-blocking layer, 60: capacitor, 81: insulating layer, 82: insulating layer 83: insulating layer 84: insulating layer, 90: backlight unit, 100: electronic device, 100*a*: electronic device, 100*b*: electronic device, 111: opening, 111*a*: opening, 111*b*: opening, 111*e*: opening, 111*f*: opening, 112: housing, 112*a*: housing, 112*b*: housing, 113*a*: light guide path, 113*b*: light guide path, 113*c*: light guide path, 113*d*: light guide path, 114: light-emitting element, 114*a*: light-emitting element, 114*b*: light-emitting element, 115: light-receiving element. 115*a*: light-receiving element, 115*b*: light-receiving element, 116: printed circuit board, 117: optical layer, 117*a*: reflective layer, 117*b*: light guide layer. 117*c*: diffusion layer, 118: TFT layer, 118*a*: TFT layer, 118*b*: liquid crystal layer, 118*c*: CF layer, 118*d*: light-emitting element. 11*e*: TFT layer, 118*f*: TFT layer, 119: polarizing layer, 119*a*: polarizing layer, 120: optical module, 120*a*: optical conversion element. 120*b*: optical conversion element, 120*c*: optical conversion element. 121: light-emitting diode, 122: fluorescent substance, 122*a*: fluorescent substance, 122*b*: fluorescent substance, 122*c*: fluorescent substance, 123: substrate, 124: lens, 125: optical module, 130: display device, 130*a*: display surface. 131: display device, 131*a*: display surface, 131*b*: display surface, 132: display device, 132*a*: display surface, 132*b*: display surface, 812: moving mechanism, 813: moving mechanism, 815: stage, 816: ball screw mechanism, 820: laser, 821: optical system unit, 822: mirror, 823: microlens array, 824: mask, 825: laser light, 826: laser light, 827: laser beam. 830: substrate, 840: amorphous silicon layer, 841: polycrystalline silicon layer. 1100: display device, 1322*b*: display surface, 7000: display device, 7000*a*: display surface, 7000*b*: display surface, 7100: electronic device, 7101: housing, 7102: opening, 7102*a*: opening, 7103: lighting device, 7200: electronic device, 7201: housing, 7202: opening, 7202*a*: opening. 7300: electronic device, 7301: housing, 7302: opening, 7302*a*: opening, 7303: light, 7400: laptop personal computer, 7401: housing, 7402: opening, 7402*a*: opening, 7402*b*: opening, 7402*c*: opening, 7403: pointing device, 7404: external connection port, 7405: keyboard, 7500: tablet, 7501: housing, 7502: opening, 7502*a*: opening, 7503: image sensor, 7504: switch. 7600: digital video camera, 7601: housing, 7601*a*: housing, 7602: opening, 7602*a*: opening, 7604: operation switch, 7605: image sensor, 7606: movable portion switch, 7700: refrigerator, 7701: housing, 7701*a*: door, 7701*b*: door, 7702: opening, 7702*a*: opening, 7703: microphone, 7704: image sensor, 7705: speaker, 7800: smartwatch, 7801: housing, 7802: opening, 7802*a*: opening, 7803: switch, 7804: crown, 7805: image sensor, 7806: belt

The invention claimed is:

1. An optical module comprising:
    a first light-emitting element;
    a first optical conversion element;
    and a first light-receiving element,
    wherein the first light-emitting element comprises a plurality of fluorescent substances and a light-emitting diode,
    wherein the first optical conversion element comprises a first optical filter,
    wherein the light-emitting diode is capable of emitting first light,
    wherein the plurality of fluorescent substances are capable of emitting second light by being excited by the first light,
    wherein the first optical filter is capable of forming third light having a wavelength range longer than 680 nm from the second light,
    wherein the second light serves as a light source,
    wherein the first light-receiving element is capable of detecting the third light, and
    wherein the first light-receiving element serves as a sensor detecting the existence of a shielding object on a light path connecting the first light-emitting element and the first light-receiving element.

2. The electronic device according to claim 1, wherein the light-emitting diode is capable of emitting near-ultraviolet light, wherein the light-emitting diode emits light in which emission intensity of any one of wavelengths within a wavelength range longer than 680 nm is greater than an average value of emission intensity of a wavelength range from 550 nm to 560 nm, by exciting the fluorescent substances, and wherein the plurality of fluorescent substances emit white light having a wavelength of 680 nm or less by being excited by the light-emitting diode.

3. An electronic device comprising:
    an optical module;
    a housing; and
    a display device,
    wherein the housing comprises a first opening, a second opening, and a third opening, wherein the display device comprises a first display region, wherein the first display region is placed to overlap with the first opening, wherein the optical module comprises a first light-emitting element, a first optical conversion element, and a first light-receiving element, wherein the first light-emitting element comprises a plurality of fluorescent substances and a light-emitting diode, wherein the first optical conversion element comprises a first optical filter, wherein the light-emitting diode is capable of emitting first light, wherein the plurality of fluorescent substances emit second light by being excited by the first light, wherein the first optical filter is capable of forming third light having a wavelength range longer than 680 nm from the second light, wherein the second light serves as a light source for performing display in the first display region, wherein the second opening serves as a first light guide path for delivering the third light, wherein the third opening serves as a second light guide path for the third light to enter, wherein the third light passing over the first display region is capable of reaching from the second opening to the third opening, and wherein the first light-receiving element serves a sensor detecting the existence of a shielding object on a light path connecting the first light-emitting element and the first light-receiving element.

4. The electronic device according to claim 3, wherein the display device comprises a reflective liquid crystal element, wherein the first optical conversion element comprises a second optical filter, wherein the second optical filter is capable of forming fourth light with a wavelength range of 680 nm or less from the second light, wherein the fourth light is supplied to the display device, and wherein the reflective liquid crystal element performs display in the first display region by reflecting the fourth light.

5. The electronic device according to claim 3, wherein the display device comprises a transmissive liquid crystal element, and wherein the transmissive liquid crystal element performs display in the first display region by transmitting fourth light.

6. The electronic device according to claim 5, wherein the transmissive liquid crystal element performs display in the first display region by transmitting the second light.

7. The electronic device according to claim 3, wherein the display device comprises a transistor, and wherein the transistor comprises a metal oxide in a semiconductor layer.

8. The electronic device according to claim 3, wherein the display device has a resolution higher than or equal to 8K resolution.

9. The electronic device according to claim 3, wherein the light-emitting diode is capable of emitting near-ultraviolet light, wherein the light-emitting diode emits light in which emission intensity of any one of wavelengths within a wavelength range longer than 680 nm is greater than an average value of emission intensity of a wavelength range from 550 nm to 560 nm, by exciting the fluorescent substances, and wherein the plurality of fluorescent substances emit white light having a wavelength of 680 nm or less by being excited by the light-emitting diode.

10. An electronic device comprising:

an optical module;

a housing; and a display device, wherein the housing comprises a first opening, a second opening, a third opening, a fourth opening, a fifth opening, and a sixth opening, wherein the display device comprises a first display region and a second display region, wherein the first display region is placed to overlap with the first opening, wherein the second display region is placed to overlap with the fourth opening, wherein the first opening and the fourth opening are placed to overlap with each other, wherein the optical module comprises a first light-emitting element, a second light-emitting element, a first optical conversion element, a second optical conversion element, a first light-receiving element, and a second light-receiving element, wherein the first light-emitting element and the second light-emitting element each comprise a plurality of fluorescent substances and a light-emitting diode, wherein the first optical conversion element and the second optical conversion element each comprise a first optical filter, wherein the light-emitting diode is capable of emitting first light, wherein the plurality of fluorescent substances emit second light by being excited by the first light, wherein the first optical filter included in the first optical conversion element is capable of forming third light having a wavelength range longer than 680 nm from the second light emitted by the first light-emitting element, wherein the first optical filter included in the second optical conversion element is capable of forming fourth light having a wavelength range longer than 680 nm from the second light emitted by the second light-emitting element, wherein the first light-receiving element is capable of detecting the third light, wherein the second light-receiving element is capable of detecting the fourth light, wherein the second opening serves as a first light guide path for delivering the third light, wherein the third opening serves as a second light guide path for the third light to enter, wherein the third light passing over the first display region is capable of reaching from the second opening to the third opening, wherein the first light-receiving element serves as a sensor detecting the existence of a shielding object on a light path connecting the first light-emitting element and the first light-receiving element, wherein the fifth opening serves as a third light guide path for delivering the fourth light, wherein the sixth opening serves as a fourth light guide path for the fourth light to enter, wherein the fourth light passing over the second display region is capable of reaching from the fifth opening to the sixth opening, and wherein the second light-receiving element serves as a sensor detecting the existence of a shielding object on a light path connecting the second light-emitting element and the second light-receiving element.

11. The electronic device according to claim 10, wherein the display device comprises a transmissive liquid crystal element, wherein the second light serves as a light source for performing display in the first display region and the second display region, wherein the first display region displays a first image in a first direction, wherein the second display region displays a second image in a second direction, and wherein the first image is different from the second image.

12. The electronic device according to claim 10, wherein the display device comprises a third light-emitting element, wherein the third light-emitting element serves as a light source for performing display in the first display region and the second display region, wherein the first display region displays a first image in a first direction, wherein the second display region displays a second image in a second direction, and wherein the first image and the second image are displayed mirror-symmetrically.

13. The electronic device according to claim 12, wherein the third light-emitting element comprises an LED.

14. The electronic device according to claim 12, wherein the third light-emitting element comprises an OLED.

15. The electronic device according to claim 10, wherein the housing comprises a seventh opening, and wherein the seventh opening is capable of delivering the second light or the fourth light as illumination light.

16. The electronic device according to claim 10, wherein the light-emitting diode is capable of emitting near-ultraviolet light, wherein the light-emitting diode emits light in which emission intensity of any one of wavelengths within a wavelength range longer than 680 nm is greater than an average value of emission intensity of a wavelength range from 550 nm to 560 nm, by exciting the fluorescent substances, and wherein the plurality of fluorescent substances emit white light having a wavelength of 680 nm or less by being excited by the light-emitting diode.

17. The electronic device according to claim 10, wherein the display device comprises a transistor, and wherein the transistor comprises a metal oxide in a semiconductor layer.

18. The electronic device according to claim 10, wherein the display device has a resolution higher than or equal to 8K resolution.

* * * * *